(12) United States Patent
Ishikawa

(10) Patent No.: US 7,319,909 B2
(45) Date of Patent: Jan. 15, 2008

(54) POSITION CONTROL DEVICE, MEASURING DEVICE AND MACHINING DEVICE

(75) Inventor: Nobuhiro Ishikawa, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 192 days.

(21) Appl. No.: 11/333,409

(22) Filed: Jan. 17, 2006

(65) Prior Publication Data

US 2006/0161274 A1 Jul. 20, 2006

(30) Foreign Application Priority Data

Jan. 17, 2005 (JP) ............................. 2005-009423

(51) Int. Cl.
G05B 13/02 (2006.01)
G05B 11/01 (2006.01)

(52) U.S. Cl. ........................................ 700/28; 318/560

(58) Field of Classification Search .................. 700/28
See application file for complete search history.

(56) References Cited

U.S. PATENT DOCUMENTS

| 5,025,362 | A | * | 6/1991 | Darlington et al. ........... 700/63 |
| 5,025,385 | A | * | 6/1991 | Froyd .......................... 700/169 |
| 5,610,489 | A | * | 3/1997 | Hart et al. .................. 318/571 |
| 5,886,494 | A | * | 3/1999 | Prentice et al. ............. 318/625 |
| 6,097,168 | A | * | 8/2000 | Katoh et al. ........... 318/568.11 |
| 6,128,546 | A | * | 10/2000 | Basista et al. ............... 700/166 |
| 6,374,155 | B1 | * | 4/2002 | Wallach et al. ............. 700/245 |
| 6,532,404 | B2 | * | 3/2003 | Colens ........................ 700/262 |
| 6,564,110 | B1 | * | 5/2003 | Makino et al. ............... 700/56 |
| 6,697,683 | B1 | * | 2/2004 | Tisue .......................... 700/56 |
| 6,738,679 | B2 | * | 5/2004 | Fujita et al. .................. 700/56 |
| 7,062,334 | B2 | * | 6/2006 | Tanaka et al. ................ 700/69 |
| 2003/0009260 | A1 | * | 1/2003 | Tanaka et al. ............. 700/245 |

FOREIGN PATENT DOCUMENTS

JP 2004-118635 4/2004

* cited by examiner

*Primary Examiner*—Thomas K. Pham
(74) *Attorney, Agent, or Firm*—Rankin, Hill, Porter & Clark LLP

(57) ABSTRACT

In a quadruple loop position control device (1) including: a drive controller (5) having a current control loop that controls motor current (I) and a motor speed control loop that controls a motor speed (Vm); a speed control loop (3) that controls a speed (Vd) of a driven body (2); and a position control loop (4) that controls a position (Pd) of the driven body (2), an adder (6) that adds an output value from the position control loop (4) and an output value from the speed control loop (3) and inputs an addition result to the motor speed control loop is provided. By providing the adder (6), the position control device (1) functions as a control device of a first-order system, so that occurrence of an overshoot may securely be avoided even when respective transfer functions of the position control device (1) are set for purpose of suppressing a vibrating behavior of the driven body (2).

15 Claims, 29 Drawing Sheets

POSITION CONTROL DEVICE, MEASURING DEVICE AND MACHINING DEVICE

BACKGROUND OF THE INVENTION

1. Field of the Invention

The present invention relates to a position control device, a measuring device and a machining device. In particular, the present invention relates to a position control device that controls a position of a driven body driven by a driver according to a predetermined position command, as well as to a measuring device and a machining device each including the position control device.

2. Description of Related Art

Conventionally, there has been known a servomechanism that controls a position of a driven body driven by a motor etc. according to a predetermined position command (for instance, see Document 1: JP-A-2004-118635). The servomechanism is utilized for a NC (numerical control) coordinate measuring machine, a NC machine tool etc.

To drive and control a low rigid load (a driven body) causing vibrating response to a displacement, a speed and an acceleration thereof since a low rigid portion is provided at a connection with the motor for instance, the servomechanism has been developed, which includes a quadruple loop control system having a speed control loop that controls a speed of the load, in addition to a current control loop, a motor speed control loop and a position control loop that controls a position of the load (see aforementioned Document 1).

FIG. 25 shows an arrangement of the conventional servomechanism 10.

In FIG. 25, the current control loop and the motor speed control loop are grouped as a drive controller 50 having a transfer function Gm. Note that the drive controller 50 outputs a motor speed Vm as an output from the motor speed control loop. And, a transfer characteristic of the driven body 20 is defined as Gf.

Though detail arrangement is omitted, the current control loop has a motor, a motor drive power amplifier, a motor torque current detector and a current characteristic compensator, whereas the motor speed control loop has a motor rotation position detector that detects a rotation position of the motor, a differentiator that calculates a rotation speed of the motor by differentiating the rotation position of the motor, and a motor speed characteristic compensator.

The speed control loop 30 includes a differentiator 330 that differentiates the position Pd of the driven body 20 to calculate the speed Vd of the driven body 20, a speed comparator 310 that compares a speed command Vdr output from the position control loop 40 with the speed Vd of the driven body 20 calculated by the differentiator 330 to output a speed error Evd=Vdr−Vd, and a speed characteristic compensator 320 having a transfer function Glv. Note that an output from the speed characteristic compensator 320 is a motor speed command Vmr for the motor speed control loop.

The position control loop 40 includes a position comparator 410 that compares the current position Pd of the driven body 20 with a predetermined position command Pdr to output a position error Epd=Pdr−Pd, and a position characteristic compensator 420 having a proportional gain K. Note that reference numeral 430 in FIG. 25 represents an integrator element having a transfer function 1/s ("s" is Laplace operator), which integrates the speed Vd of the driven body 20 to calculate the position Pd of the driven body 20.

By having the speed control loop 30, vibration suppressiveness of a control system can be enhanced even when rigidity of the driven body 20 is low, thereby controlling the position or the speed of the driven body 20 stably and highly accurately.

According to the servomechanism 10, any transfer characteristic can be provided by setting the respective transfer functions and gains to appropriate values. The respective transfer functions and gains can be set for a variety of purposes. For example, the respective transfer functions and gains can be set to restrict a torque ripple of the motor included in the drive controller 50 and a vibrating behavior of the driven body 20 caused by a disturbance such as a frictional force acting on the driven body 20, or to avoid an overshoot of the position Pd and speed Vd of the driven body 20 relative to the position command Pdr and the speed command Vdr.

The transfer characteristic of the servomechanism 10 is discussed below.

To simplify the description, the discussion is held on the presumption that a response frequency of the drive controller 50 (the transfer function Gm) and a resonant frequency of the driven body 20 (a transfer function Gf) are sufficiently higher than a break frequency of the speed characteristic compensator 320 (the transfer function Glv) in the speed control loop 30. According to the presumption, Gm and Gf can be approximated as Gm≈1 and Gf≈1, thus the servomechanism 10 of FIG. 25 can be redrawn as the one shown in FIG. 26. Then, when equivalently transforming the speed control loop 30 of FIG. 26, the arrangement in FIG. 28 can be obtained through the arrangement in FIG. 27. If further equivalently transforming the arrangement in FIG. 28 (not shown), a transfer function Gc from the position command Pdr to the position output Pd can be expressed by an Equation (1) as follows.

$$Gc = \frac{1}{1+\left(1+\frac{1}{Glv}\right)\frac{s}{K}} \qquad \text{Equation (1)}$$

As expressed in the Equation (1), the transfer function Gc includes the transfer function Glv of the speed characteristic compensator 320 in the speed control loop 30.

Incidentally, when setting Glv for suppressing the vibrating behavior of the driven body 20 in the above-described servomechanism 10 having the transfer characteristic Gc including Glv, there may be occurred the overshoot. This is because not all the set Glv for suppressing the vibrating behavior are appropriate for preventing the overshoot of the position Pd and the speed Vd of the driven body 20 from occurring relative to the position command Pdr and the speed command Vdr. In addition, when the Glv is set for preventing the overshoot from occurring, the driven body 20 may vibrate since not all the set Glv are appropriate for suppressing the vibrating behavior of the driven body 20.

SUMMARY OF THE INVENTION

An object of the present invention is to provide a position control device that can suppress a vibrating behavior of a driven body and prevent occurrence of an overshoot of a position and a speed of the driven body, as well as to a measuring device and a machining device each including the position control device.

A position control device according to an aspect of the invention controls a position of a driven body driven by a driver according to a predetermined position command. The position control device includes: a position control loop including a position comparator that compares a current position of the driven body with the position command, and a position characteristic compensator that performs position characteristic compensation of the driven body based on a comparison result of the position comparator; a speed control loop including a speed comparator that compares a current speed of the driven body with an output value from the position characteristic compensator as a speed command, and a speed characteristic compensator that performs speed characteristic compensation of the driven body based on a comparison result of the speed comparator; an adder that adds the output value from the position characteristic compensator and an output value from the speed characteristic compensator; and a drive controller that operates the driver to drive the driven body based on an addition result of the adder.

Note that "the position control loop" that controls the position of the driven body is not limited to the one that directly controls the position of the driven body, and may include the one that indirectly controls the position of the driven body by controlling a position of a movable part (for example, a rotor in a rotational motor or a direct acting member in a linear motor) in the driver for driving the driven body. Similarly, "the speed control loop" that controls the speed of the driven body is not limited to the one directly controls the speed of the driven body, and may include one indirectly control the speed of the driven body by controlling a speed of the movable part in the driver.

An exemplary arrangement of such position control device of the present invention is shown in FIG. 1.

Note that the aspect of the present invention is not limited to the exemplary arrangement shown in this drawing, and may include a modification of the arrangement within a scope of achieving the object of the present invention, in particular, may include an equivalent transformation of the arrangement in FIG. 1 within the technical scope of the present invention.

In FIG. 1, the reference numeral 1 represents the position control device of the aspect of the present invention, 2 represents the driven body, 3 represents the speed control loop, 4 represents the position control loop, 5 represents the drive controller, 6 represents the adder, 31 represents the speed comparator, 32 represents the speed characteristic compensator, 41 represents the position comparator, and 42 represents the position characteristic compensator. In addition, 33 represents a differentiator that differentiates the position Pd of the driven body 2 to calculate the speed, and 43 represents an integrator element. Note that the integrator element 43 having a transfer function 1/s ("s" is Laplace operator) is arranged as a position detector that detects the position Pd of the driven body 2 in the actual device arrangement. The driver is shown as being grouped with the drive controller 5, instead of being shown by itself.

The position control device 1 of the aspect of the present invention differs greatly from the conventional servomechanism 10 shown in FIG. 25 in that the position control device 1 has the adder 6.

A transfer characteristic of the position control device 1 according to the aspect of the present invention will be discussed below.

As similar to the description on the conventional servomechanism 10, to simplify the description, the discussion is held on the presumption that the response frequency of the drive controller 5 (the transfer function Gm) and the resonant frequency of the driven body 2 (the transfer function Gf) are sufficiently higher than the break frequency of the speed characteristic compensator 32 (the transfer function Glv) in the speed control loop 3. Therefore, the position control device 1 in FIG. 1 can be redrawn as the arrangement in FIG. 2 according to the approximation of Gm≈1 and Gf≈1.

If the arrangement in FIG. 2 is equivalently transformed to the arrangement in FIG. 3 and a portion between the position characteristic compensator 42 and the integrator element 43 in FIG. 3 is then equivalently transformed, the arrangement in FIG. 4 can be obtained. Further, if the two portions surrounded by dashed lines in FIG. 4 are respectively equivalently transformed, the arrangement in FIG. 5 can be obtained. In FIG. 5, since transfer functions of the respective portions obtained upon the equivalent transformation are respectively (Glv+1)/Glv and Glv/(Glv+1), i.e., in an inverse relation, the transfer function becomes "1" by multiplying them. Then, if further equivalently transforming the arrangement in FIG. 5 (not shown), the transfer function Gn from the position command Pdr to the position output Pd can be expressed by an Equation (2) as follows.

$$Gn = \frac{1}{1+\frac{1}{K}s} \qquad \text{Equation (2)}$$

When comparing the Equation (2) with the Equation (1) for the conventional servomechanism 10, it is obvious that Gc of the Equation (1) includes Glv whereas Gn of the Equation (2) does not include Glv. Additionally, since the denominator of the right side of the Equation (2) is a primary expression of the Laplace operator s, it is obvious that the position control device 1 of the aspect of the present invention is a control device of a first-order system.

Note that the equivalent transformation performed in the flow from FIG. 1 to FIG. 5 is performed only for describing that the position control device 1 of the aspect of the present invention is the control device of the first-order system, and therefore, such equivalent transformation is not essentially required for the arrangement of the aspect of the present invention.

As for the above-described control device of the first-order system, it is typically known that no overshoot occurs for the position and the speed of the driven body. Therefore, the position control device 1 of the aspect of the present invention can securely avoid occurrence of the overshoot.

Additionally, since the Equation (2) does not include Glv, occurrence of the overshoot can constantly be avoided irrespective of setting of Glv. Accordingly, if Glv is set for suppressing the vibrating behavior of the driven body, the vibrating behavior of the driven body can be suppressed as well as occurrence of the overshoot can be avoided reliably.

Preferably, in the above-described position control device, the driver may include a movable part provided movably, the driven body may be connected to the movable part to be driven, the drive controller may have a driving speed control loop that controls a driving speed of the movable part of the driver, and the driving speed control loop may include a driving speed comparator that compares a current driving speed of the movable part with the addition result of the adder as a driving speed command, and a driving speed characteristic compensator that performs driving speed characteristic compensation of the movable part based on a comparison result of the driving speed comparator.

Note that "the movable part" of the driver may be a rotor of a rotational motor generating a rotating power, or a direct acting member of a linear motor generating a linear power.

In the position control device having the above-described arrangement, since the driving speed control loop can accurately control the driving speed of an operating section of the driver, the speed and the position of the driven body can further accurately be controlled.

Preferably, in the above-described position control device, the driven body may be a low rigid load that degrades control characteristic of the position control device.

Even when the driven body is the low rigid load, the speed control loop can accurately control the speed of the low rigid load, thus suppressing the vibrating behavior of the low rigid load and preventing degradation in a control characteristic.

Preferably, in the above-described position control device, the speed characteristic compensator may have a PI (proportional plus integral) compensator.

Preferably, in the above-described position control device, the position characteristic compensator may have a P (proportional) compensator.

A measuring device according to another aspect of the invention includes: the above-described position control device, in which the driven body is a probe relating to measurement of a workpiece.

A machining device according to still another aspect of the invention includes: the above-described position control device, in which the driven body is a tool relating to machining of a workpiece.

Since the measuring device and the machining device each include the above-described position control device of the aspect of the present invention, the same effects and advantages as that of the position control device of the aspect of the present invention can be attained.

DETAILED DESCRIPTION OF PREFERRED EMBODIMENT(S)

An embodiment of the present invention will be described below with reference to the attached drawings.

Figure 6:
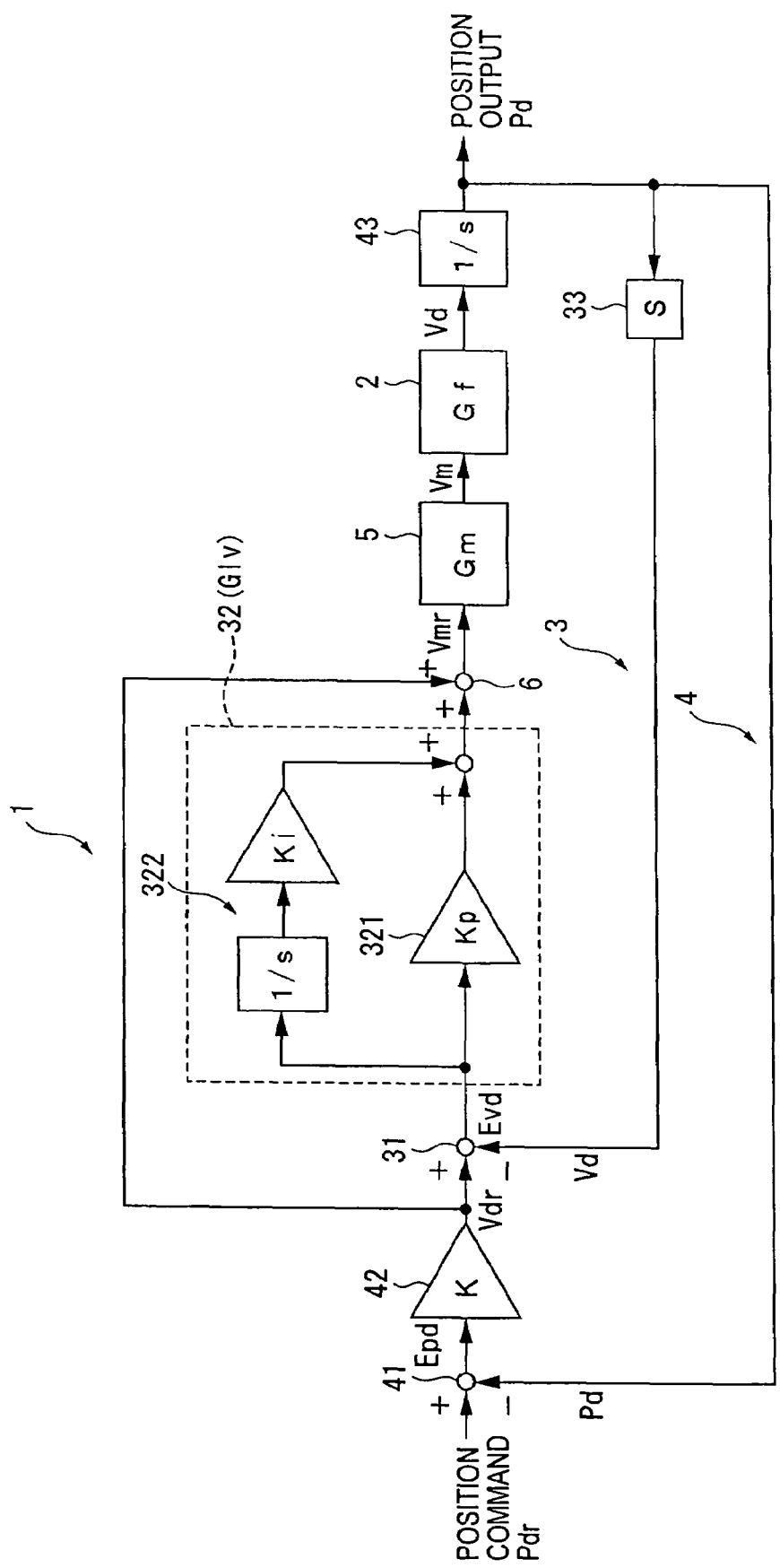
FIG. 6 is a block diagram showing an example of an arrangement of a position control device as an embodiment of the present invention.

FIG. 6 is a block diagram showing a position control device 1 of the present embodiment.

The position control device 1 controls a position Pd of a driven body 2 according to a predetermined position command Pdr, the driven body 20 being driven by a motor (not shown) as a driver. The motor includes a rotor (a movable part), so that rotating power is generated by rotating the rotor to drive the driven body 2 connected to the rotor via a certain power transmission. Note that the driven body 2 is a low rigid load.

The position control device 1 is a quadruple loop position control device including four control loops (a feedback loop) of a current control loop (not shown) that controls current I for operating the motor, a motor speed control loop (not shown) as a driving speed control loop that controls a rotation speed Vm (a driving speed) of the rotor of the motor, a speed control loop 3 that controls a speed Vd of the driven body 2, and a position control loop 4 that controls a position Pd of the driven body 2.

Note that the motor, the current control loop, and the motor speed control loop are grouped and shown as a drive controller 5 having a transfer function Gm.

The position control loop 4 includes a position comparator 41 that calculates and outputs a position error Epd=Prd−Pd of a position command Pdr input from the outside and the current position Pd of the driven body 2, and a position characteristic compensator 42 that performs position characteristic compensation of the driven body 2 by multiplying the position error Epd by a proportional gain K. Note that the position characteristic compensator 42 is a P (proportional) compensator having the proportional gain K.

The speed control loop 3 includes a speed comparator 31 that calculates a speed error Evd=Vdr−Vd of a speed command Vdr and the current speed Vd of the driven body 2 as presuming an output value K·Epd from the position characteristic compensator 42 as the speed command Vdr, and a speed characteristic compensator 32 that performs speed characteristic compensation of the driven body 2 by multiplying the speed error Evd by a transfer function Glv.

The speed characteristic compensator 32 is a PI (proportional plus integral) compensator, which includes a proportional compensator 321 and an integral compensator 322 mutually connected in parallel. The proportional compensator 321 has a proportional gain Kp. The integral compensator 322 includes 1/s expressing an integral and a gain Ki mutually connected in series. Note that the transfer function Glv of the speed characteristic compensator 32 can be expressed as Glv=Kp+(Ki/s), which is a sum of the transfer function Kp of the proportional compensator 321 and the transfer function Ki/s of the integral compensator 322.

Provided between the speed control loop 3 and the drive controller 5 is an adder 6 that adds the output value (=K·Epd=speed command Vdr) from the position characteristic compensator 42 to an output value (=Glv+Evd) from the speed characteristic compensator 32. The adder 6 inputs an addition result to the motor speed control loop as the outer control loop in the drive controller 5.

The motor speed control loop includes a motor speed comparator (a driving speed comparator) that, when presuming the addition result input from the adder 6 as a motor speed command Vmr (a driving speed command), calculates and outputs a motor speed error Evm=Vmr−Vm of the motor speed command Vmr and the current rotation speed Vm of the rotor of the motor, and a motor speed characteristic compensator (a driving speed characteristic compensator) that performs characteristic compensation of the motor speed by multiplying the motor speed error Evm by a predetermined transfer function.

The current control loop arranged inside the motor speed control loop in the drive controller 5 includes a current comparator that, when presuming the output value from the motor speed characteristic compensator as a current command Ir, calculates and outputs a current error Ei=Ir−I of the current command Ir and the current I currently input to the motor, and a current source that applies current corresponding to the current error Ei to the motor. Owing to this, a desired current equivalent to the current command Ir is applied to the motor.

As described above, the motor speed control loop controls the motor speed Vm, the speed control loop 3 controls the speed Vd of the driven body 2, and the position control loop 4 controls the position Pd of the driven body 2, accurately, so that the respective values achieve the desired values.

Incidentally, the current control loop has a motor current detector that detects the motor current I, the detected current I being input to the current comparator.

In addition, the motor speed control loop includes a rotation position detector that detects a rotation position of the rotor, and a differentiator that calculates the rotation speed Vm of the rotor by differentiating the detected rotation position, the calculated rotation speed Vm being input to the motor speed comparator.

The speed control loop 3 includes a differentiator 33 (a transfer function s) that calculates the speed Vd by differentiating the position Pd of the driven body 2, the calculated speed Vd being input to the speed comparator 31.

The position control loop 4 includes an integrator element 43 (a transfer function 1/s) that calculates the position Pd by integrating the speed Vd of the driven body 2, the calculated position Pd being input to the position comparator 41. Note that the integrator element 43 is configured as a position detector or the like that directly detects the position Pd of the driven body 2 in the actual device arrangement.

[Consideration on Overshoot]

Next, the overshoot of the position Pd and the speed Vd of the driven body 2 will be discussed for the position control device 1 having the above-described arrangement.

Figure 1:
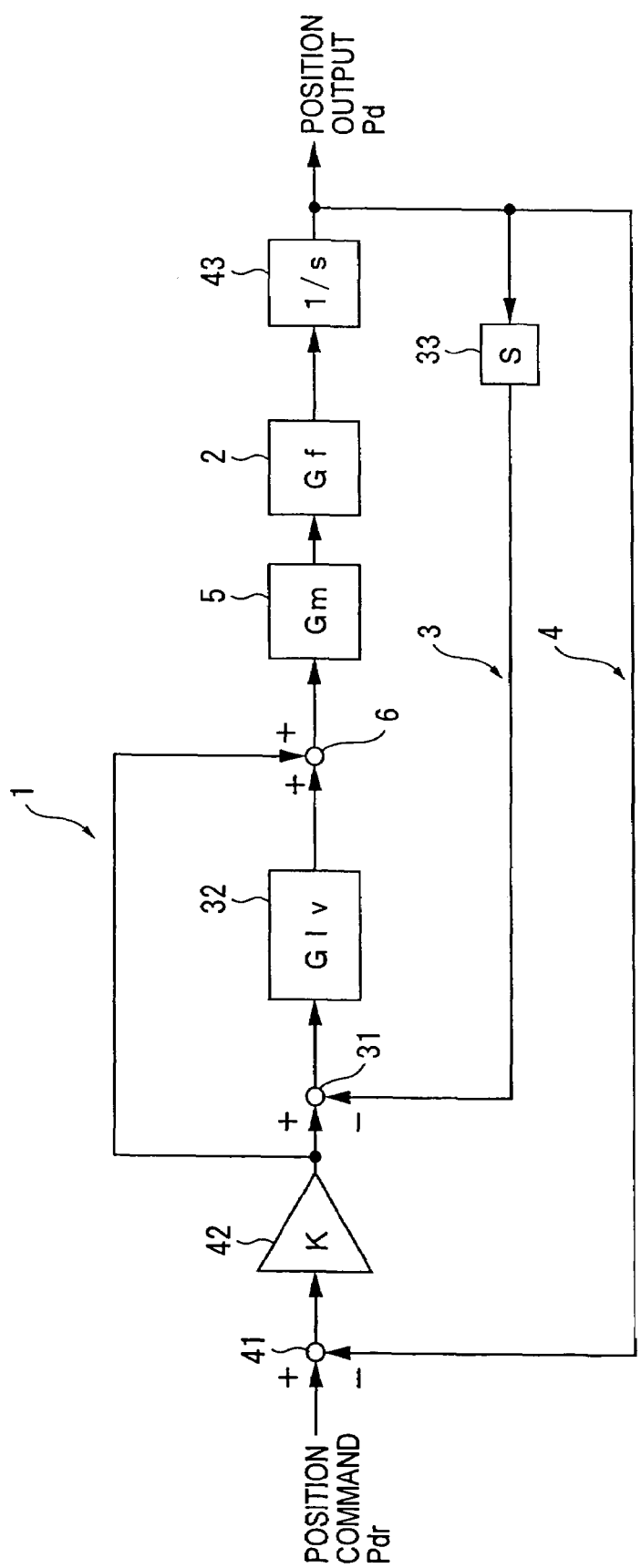
FIG. 1 is a block diagram showing an example of the arrangement of a position control device of the present invention.
Figure 2:
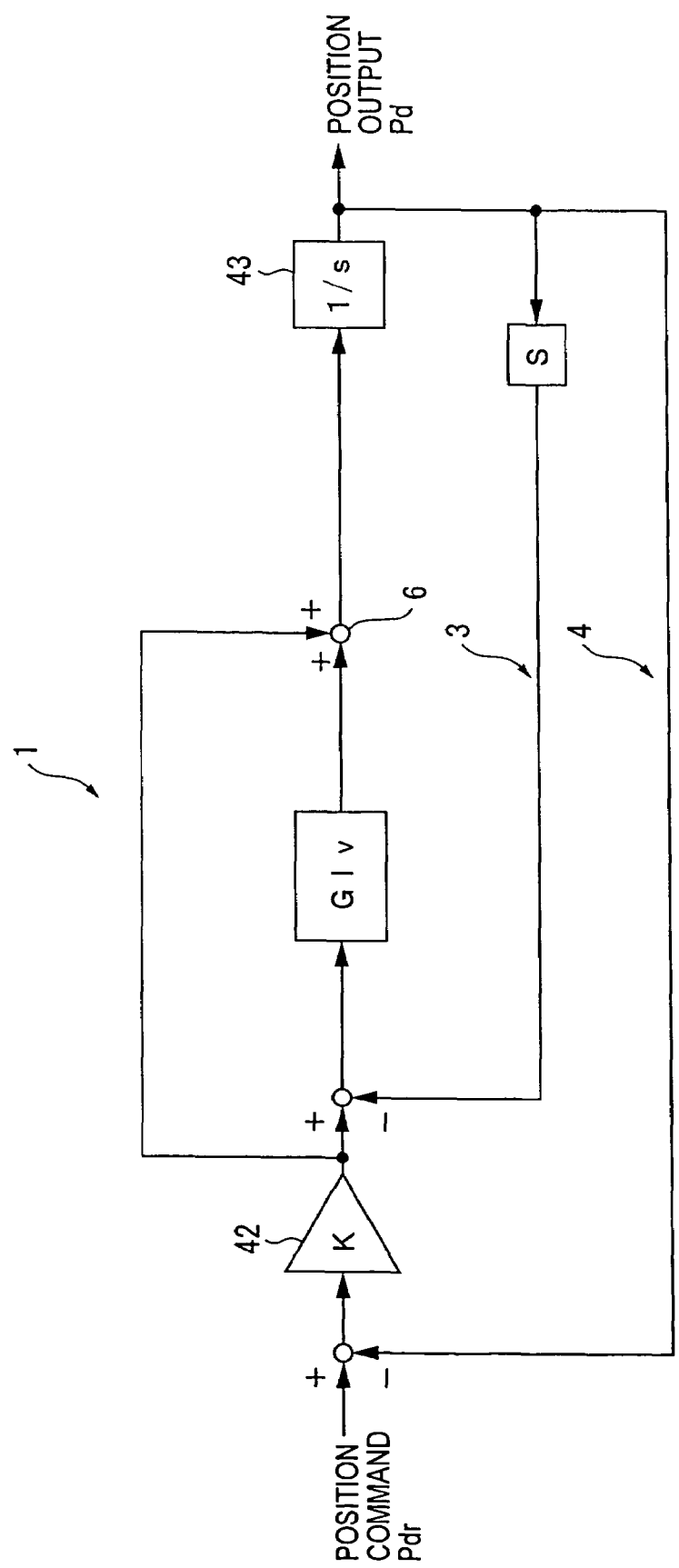
FIG. 2 is a block diagram obtained by redrawing FIG. 1 according to approximation of Gm≈1 and Gf≈1.
Figure 3:
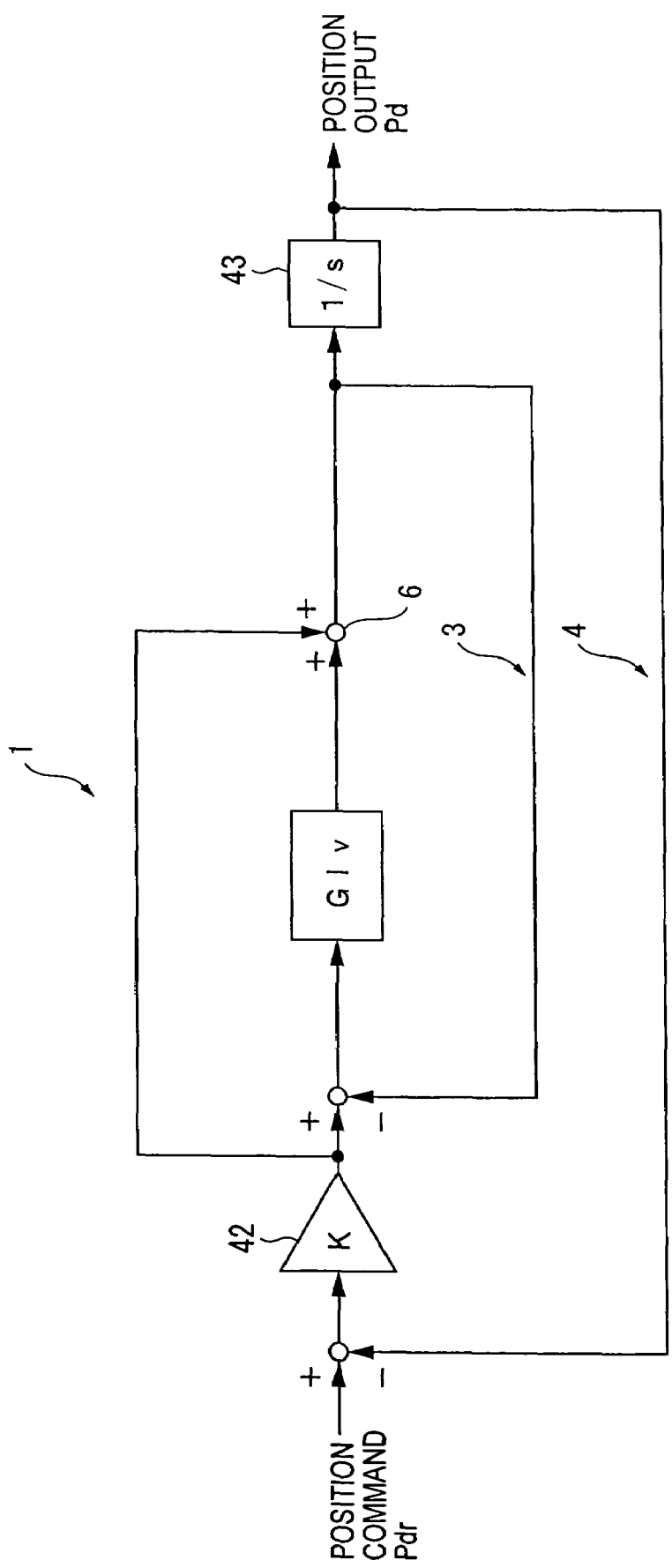
FIG. 3 is a block diagram obtained by equivalently transforming the arrangement in FIG. 2.
Figure 4:
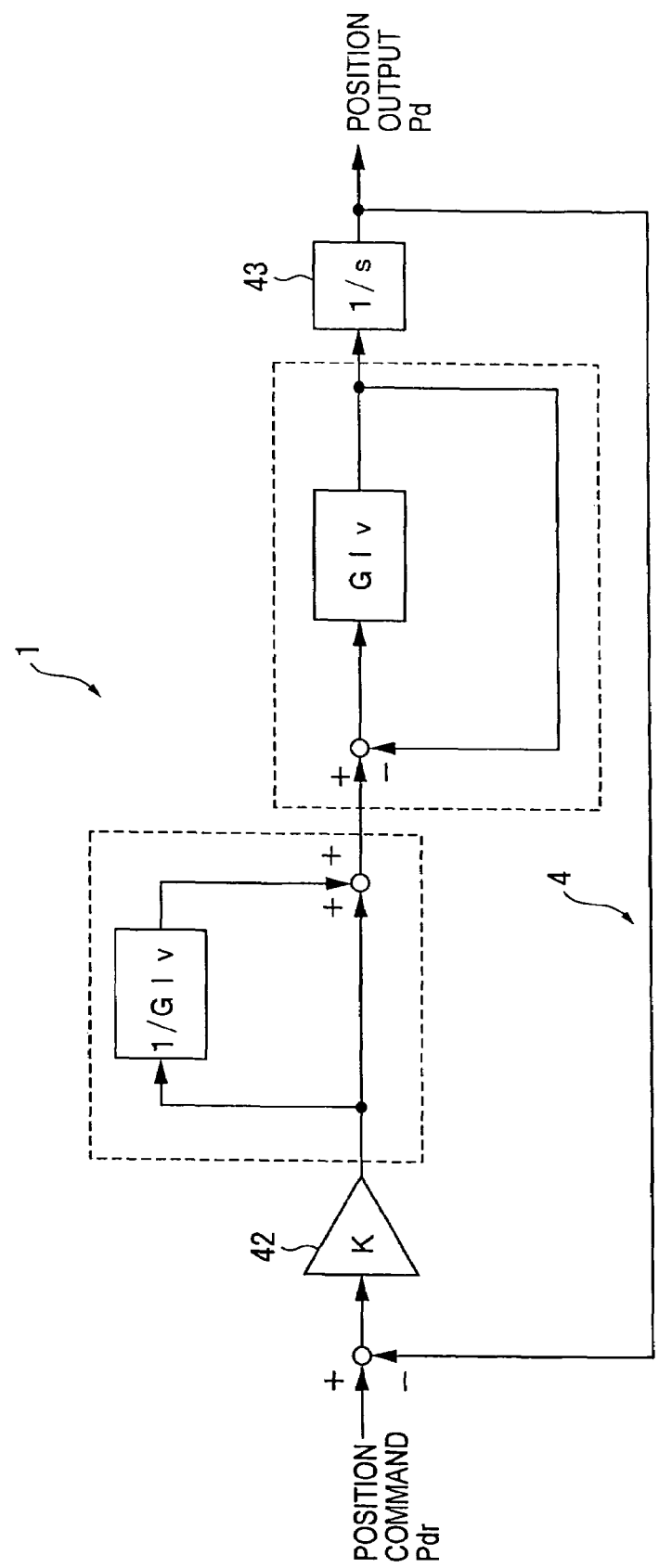
FIG. 4 is a block diagram obtained by equivalently transforming the arrangement in FIG. 3.
Figure 5:
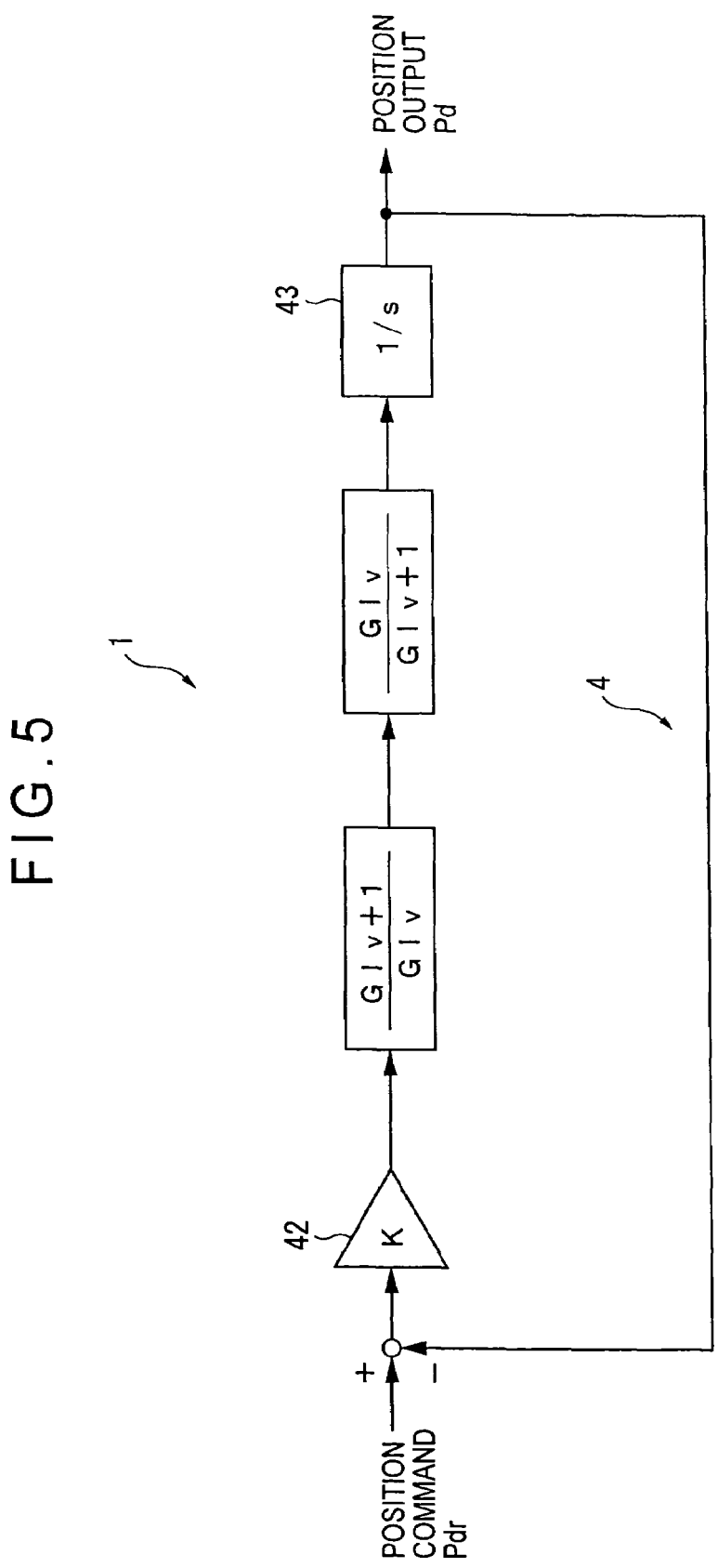
FIG. 5 is a block diagram obtained by equivalently transforming the arrangement in FIG. 4.

By substituting the transfer function Glv for the transfer function Kp+(Ki/s) of the speed characteristic compensator 32, FIG. 6 can be redrawn to be substantially the same as FIG. 1 mentioned before. Therefore, if the equivalent transformation is sequentially performed in the same manner as FIG. 1→FIG. 2→FIG. 3→FIG. 4→FIG. 5, a transfer function Gn from the position command Pdr to the position output Pd can be expressed in exactly the same manner as the Equation (2). Since the denominator of the right side of the Equation (2) is a primary expression of the Laplace operator s and the position control device 1 is a control device of a first-order system, the position control device 1 appropriately avoids the overshoot of the position Pd and the speed Vd of the driven body 2.

[Consideration on Vibrating Behavior of Driven Body 2]

Figure 25:
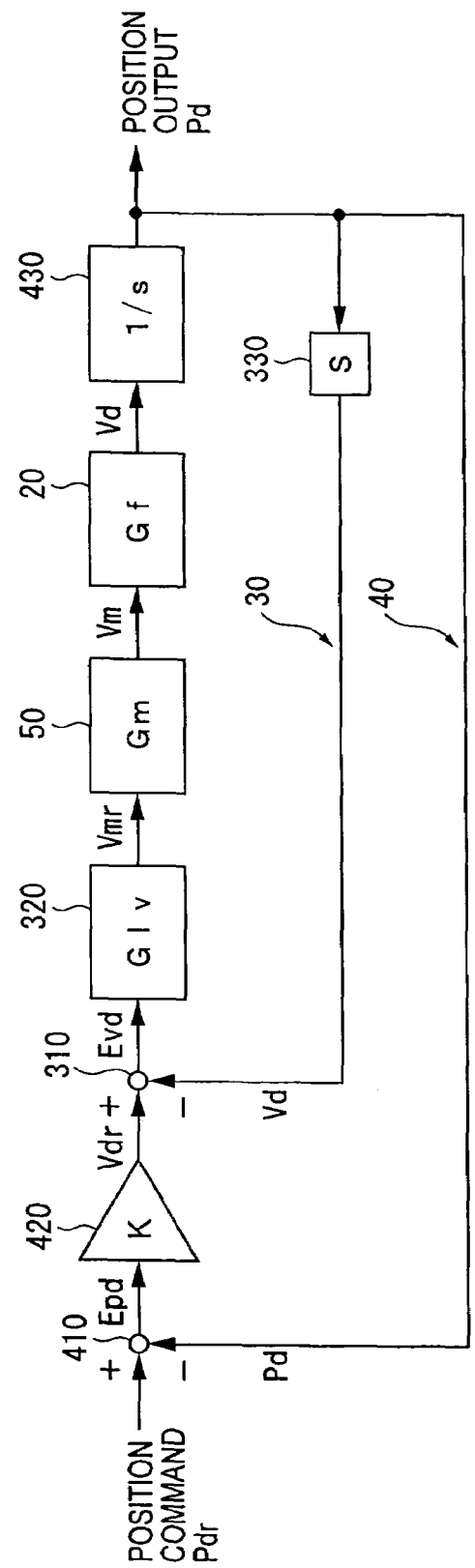
FIG. 25 is a block diagram showing the conventional servomechanism.
Figure 26:
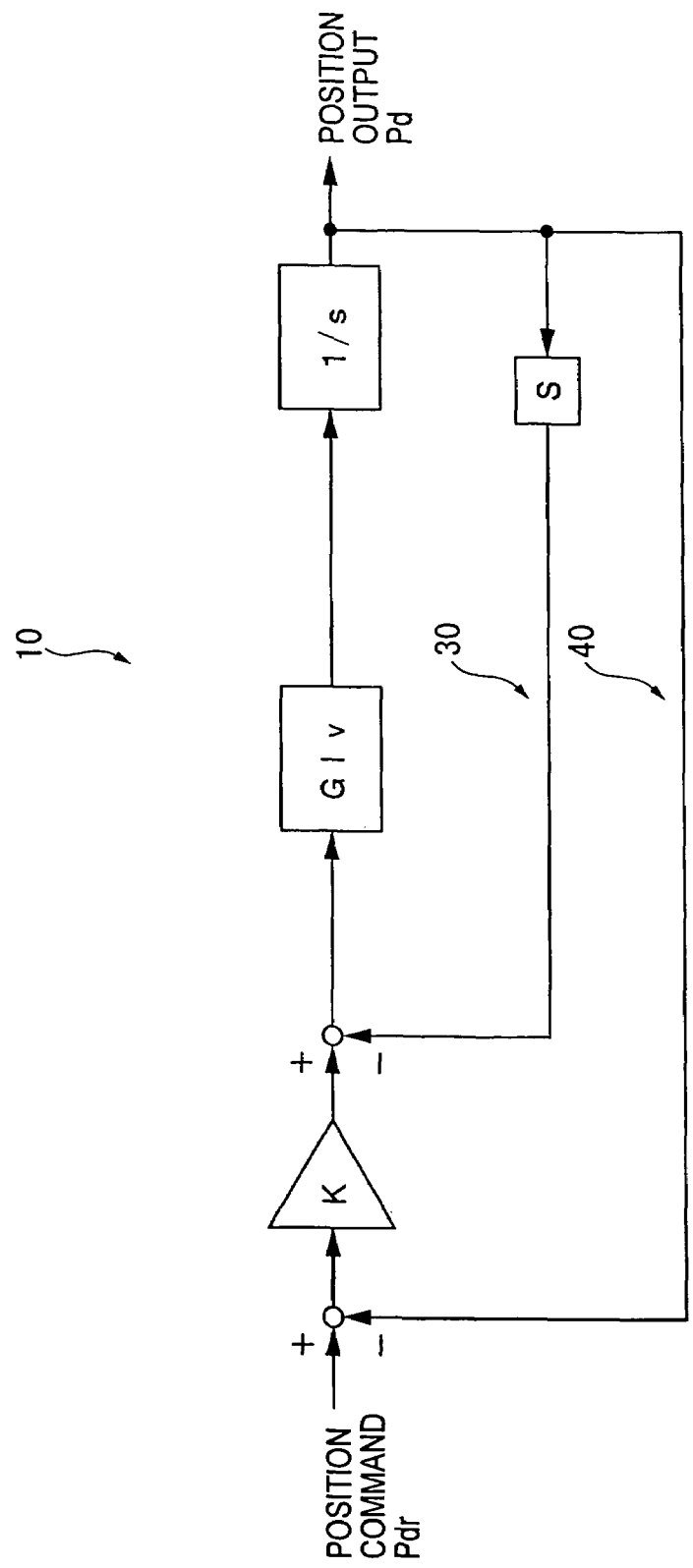
FIG. 26 is a block diagram obtained by redrawing FIG. 15 according to the approximation of Gm≈1 and Gf≈1.
Figure 27:
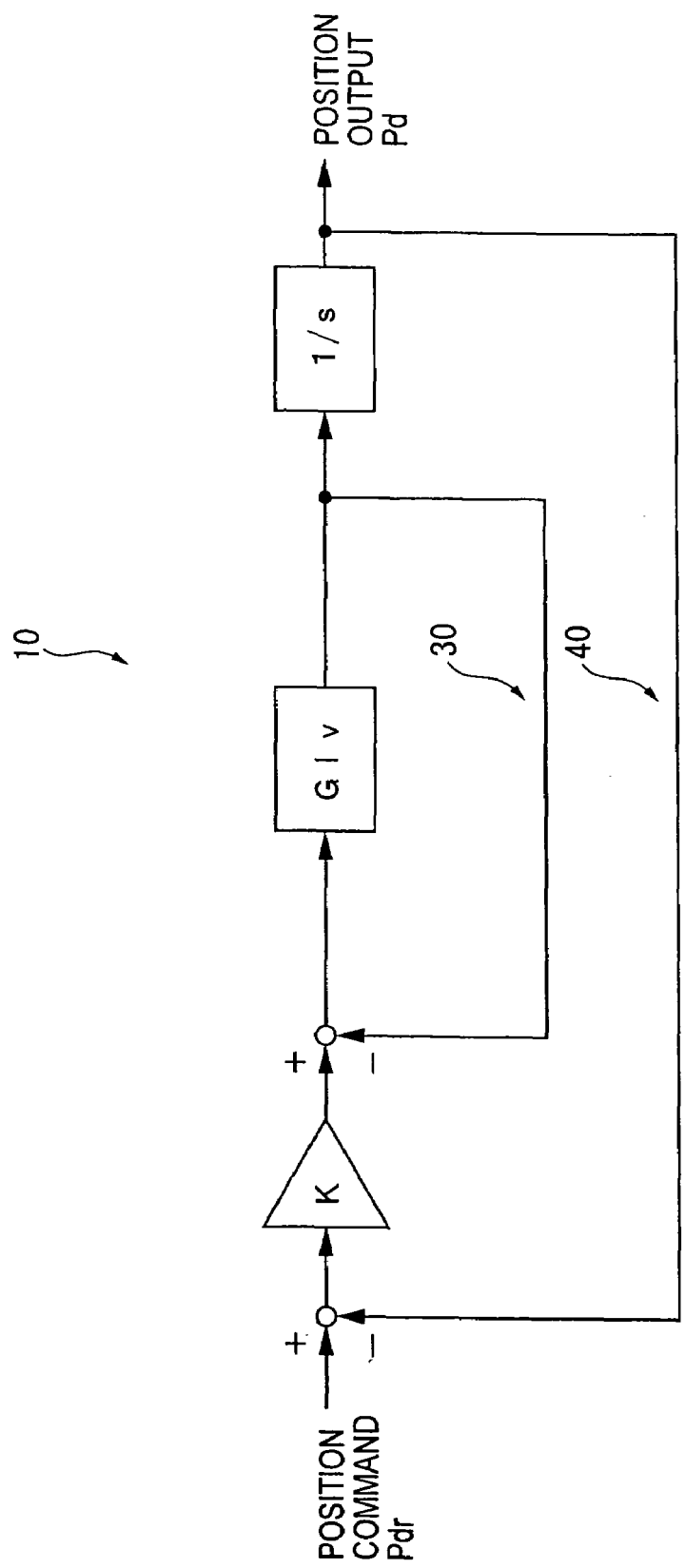
FIG. 27 is a block diagram obtained by equivalently transforming the arrangement in FIG. 26.
Figure 28:
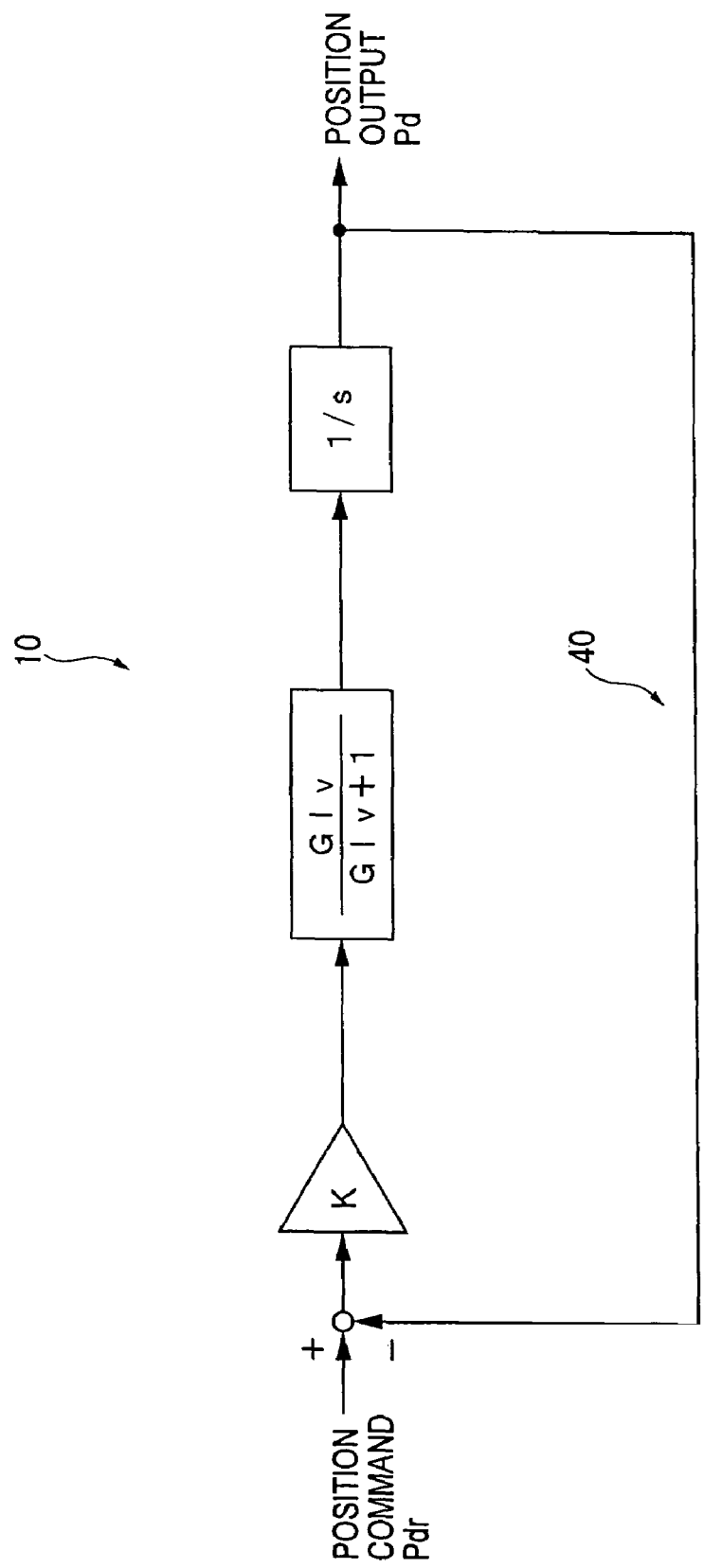
FIG. 28 is a block diagram obtained by equivalently transforming the arrangement in FIG. 27.

Next, the vibrating behavior of the driven body 2 will be discussed in contrast with the conventional servomechanism 10 having an arrangement shown in FIG. 25. For proper contrast purposes, the common gains and transfer functions (K, Kp, Glv etc.) of the position control device 1, are assumed to be the same as those of the servomechanism 10.

A case where a disturbance torque causing the vibrating behavior of the driven body 2 is applied to the control system will be discussed below. Note that the disturbance torque may be a torque ripple of the motor included in the drive controller 5, an equivalently transformed frictional force acting on the driven body 2, or the like.

Figure 7:
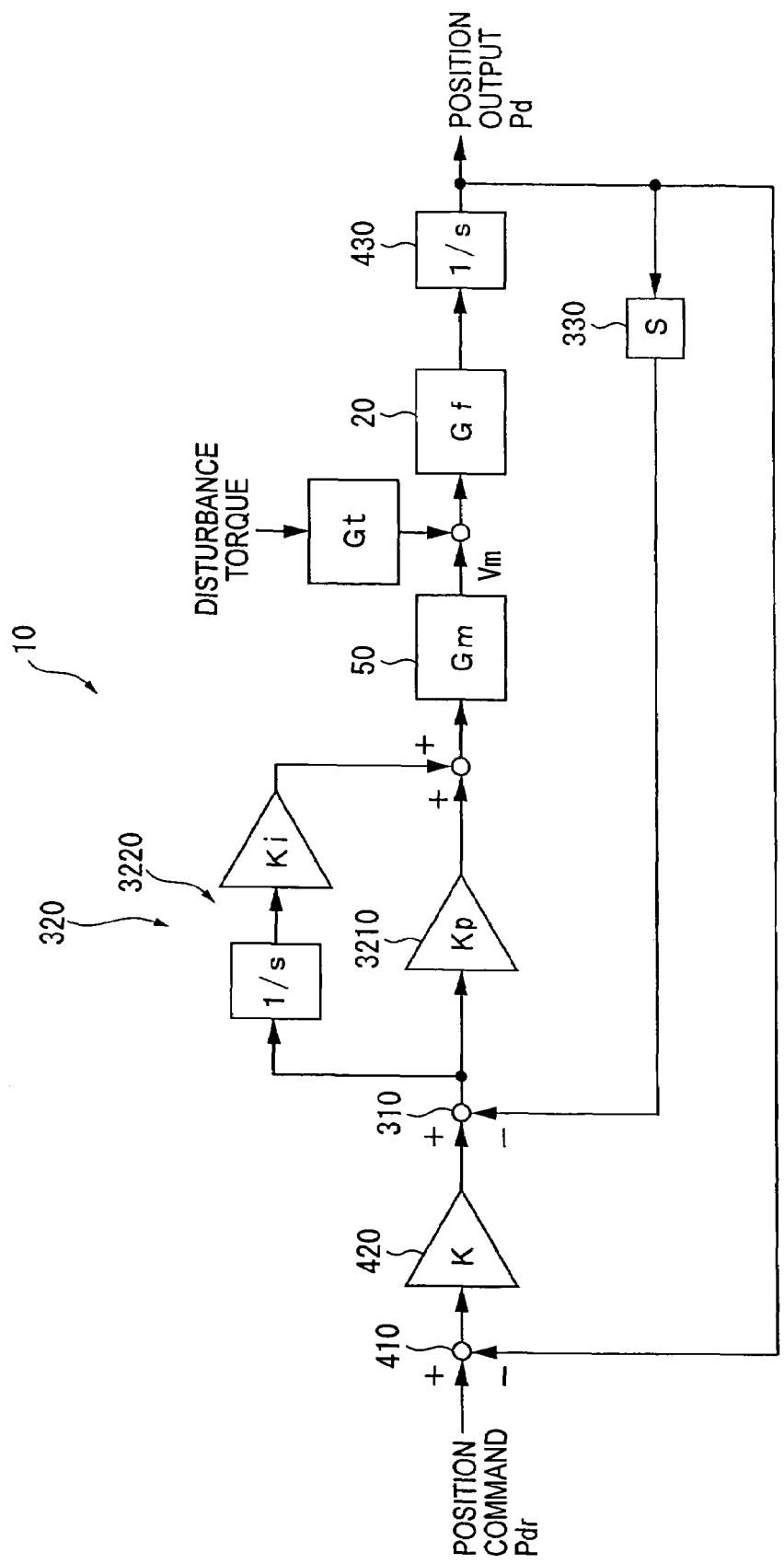
FIG. 7 is a block diagram showing an arrangement of a conventional servomechanism with a disturbance torque applied.

FIG. 7 shows the conventional servomechanism 10 (without the adder 6 of the present embodiment) with the disturbance torque applied. The disturbance torque is essentially applied to the output (torque) of the motor, however in FIG. 7, the disturbance torque is equivalently applied to the motor speed output Vm via Gt (the transfer function from the disturbance torque to the motor speed output Vm). Note that, for proper contrast of the position control device 1 and the servomechanism 10, the speed characteristic compensator 320 is a PI compensator including a proportional compensator 3210 (a gain Kp) and an integral compensator 3220 (a gain Ki), similar to the speed characteristic compensator 32 of the present embodiment.

Figure 8:
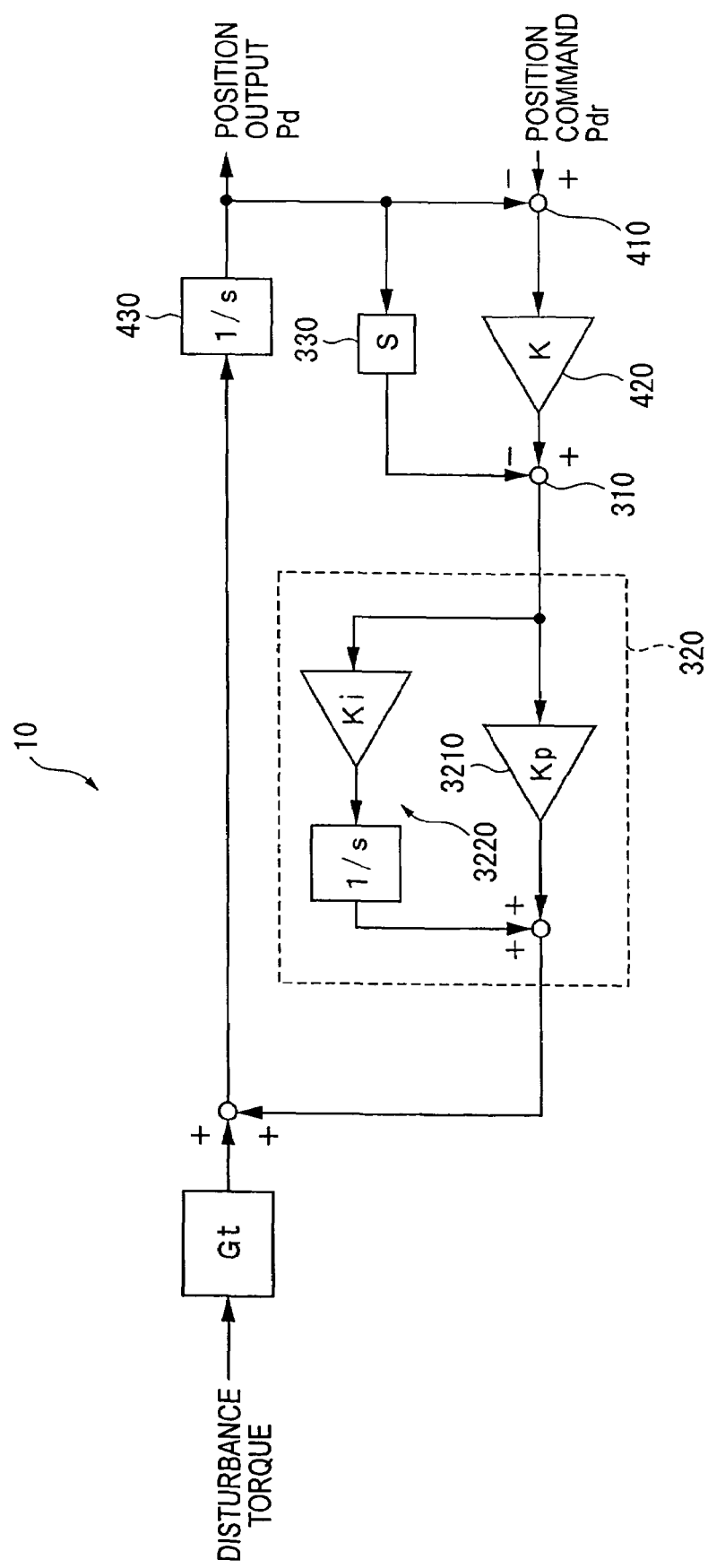
FIG. 8 is a block diagram obtained by the approximation of Gm≈1 and Gf≈1 as well as by presuming a disturbance torque as an input to the servomechanism to modify the arrangement in FIG. 7.

Like the above description, the description will be given with the approximation of Gm≈1 and Gf≈1. FIG. 7 can be redrawn as the arrangement in FIG. 8 by the approximation as well as by presuming the disturbance torque as an input to the servomechanism 10.

Figure 9:
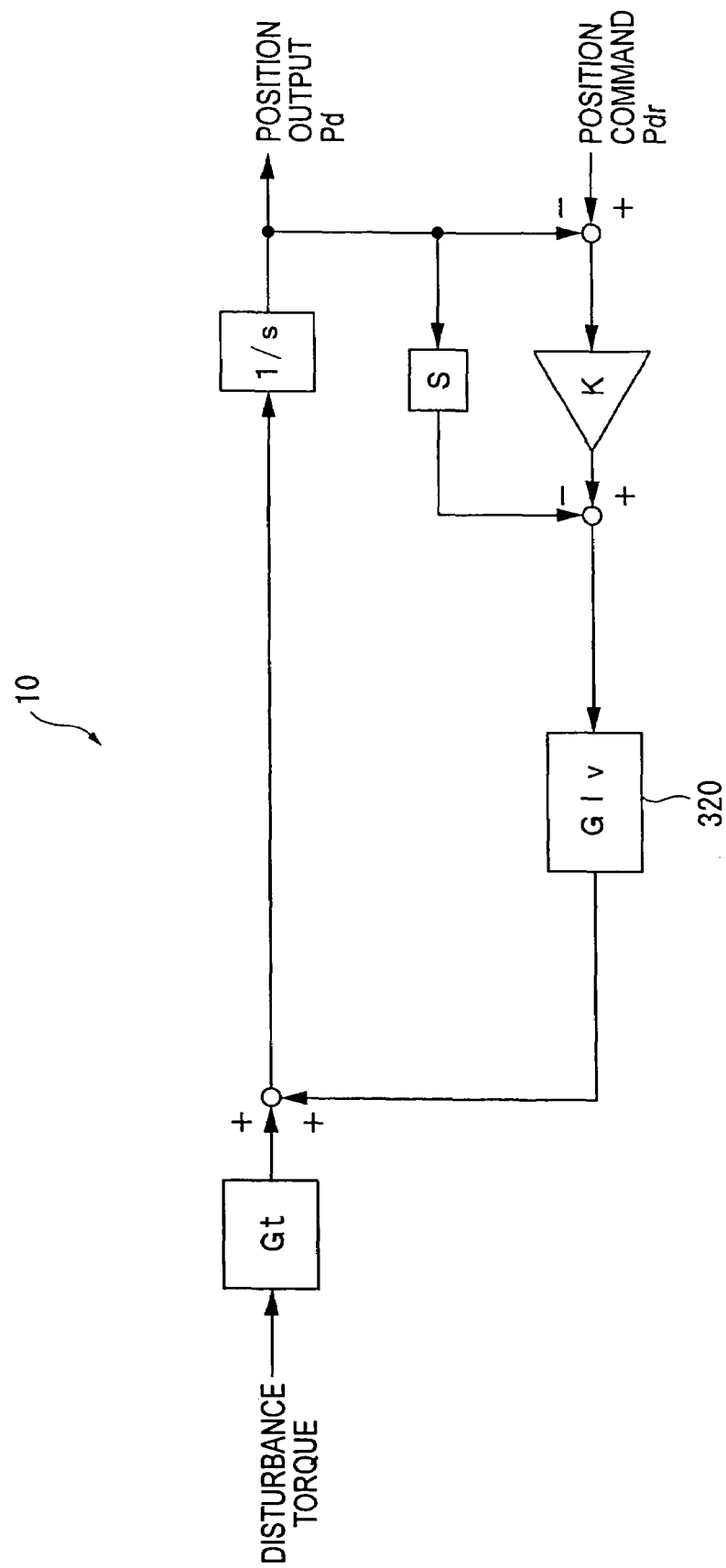
FIG. 9 is a block diagram obtained by equivalently transforming the arrangement in FIG. 8.
Figure 10:
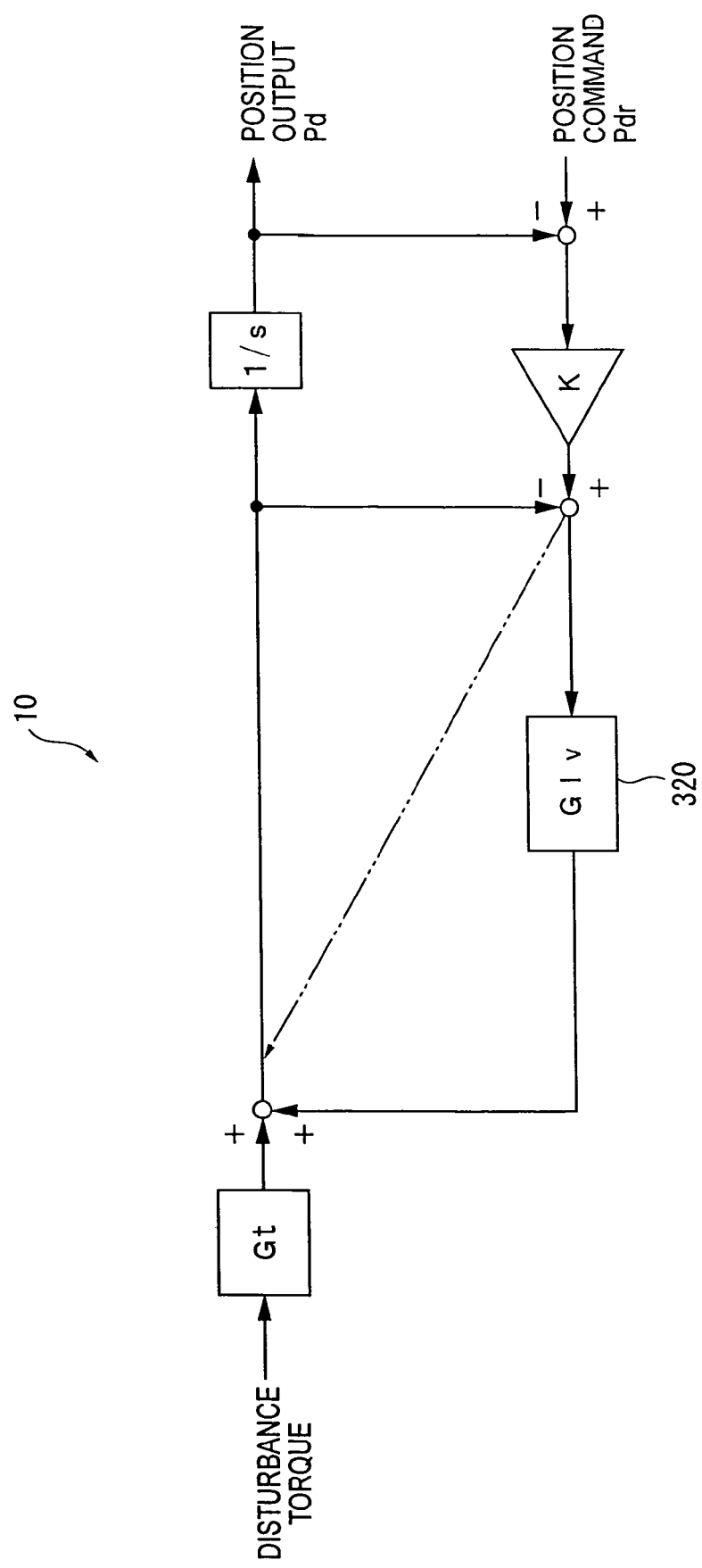
FIG. 10 is a block diagram obtained by equivalently transforming the arrangement in FIG. 9.

Then, if the proportional compensator 3210 and the integral compensator 3220 are grouped as the speed characteristic compensator 320 having the transfer function of Kp+(Ki/s)=Glv, the arrangement in FIG. 9 can be obtained, and if further equivalently transforming the arrangement in FIG. 9, the arrangement in FIG. 10 can be obtained.

Figure 11:
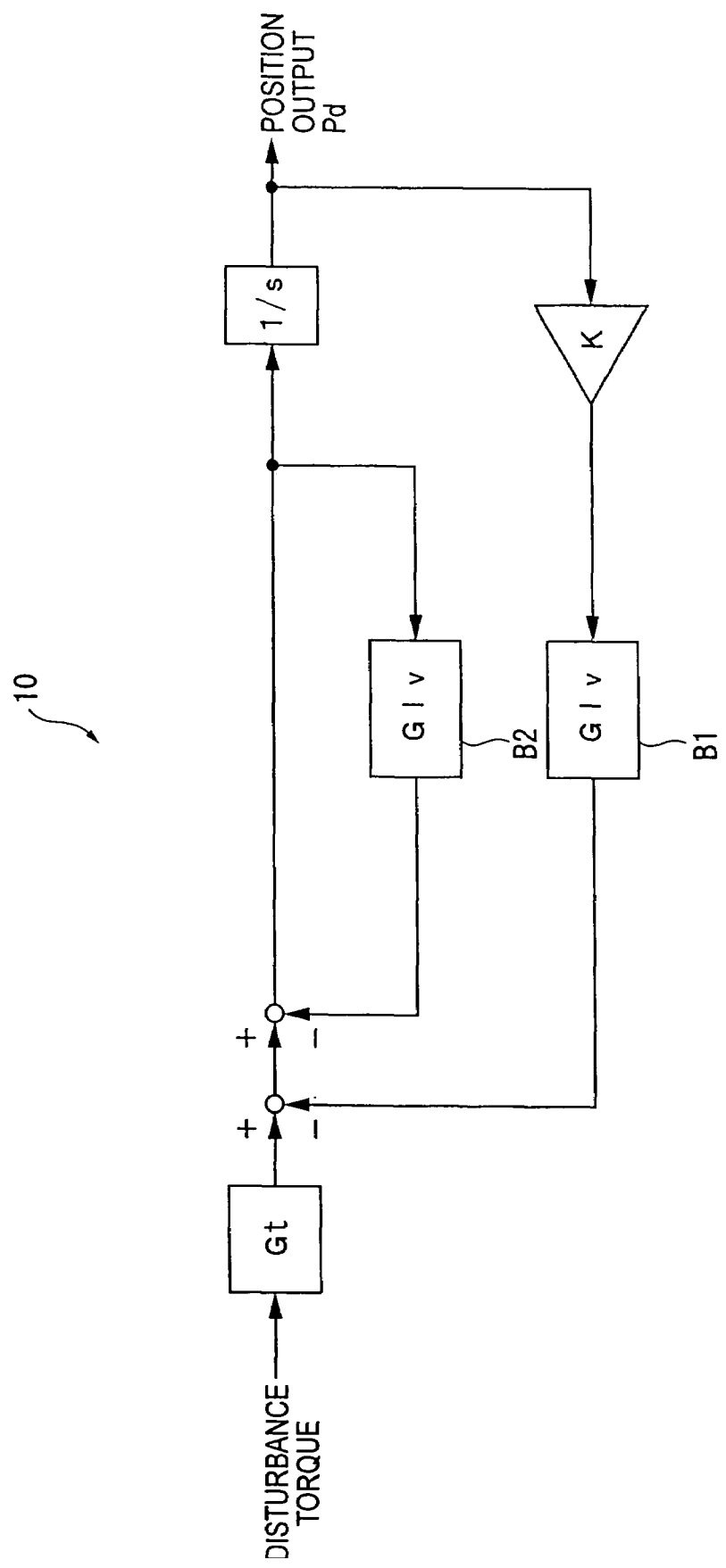
FIG. 11 is a block diagram obtained by equivalently transforming the arrangement in FIG. 10 when presuming a position command Pdr as 0.

Then, if the position command Pdr is presumed as 0 for only taking influence of the disturbance torque into consideration, and a subtraction point is changed (see imaginary line in FIG. 10), the arrangement in FIG. 11 can be obtained.

Figure 12:
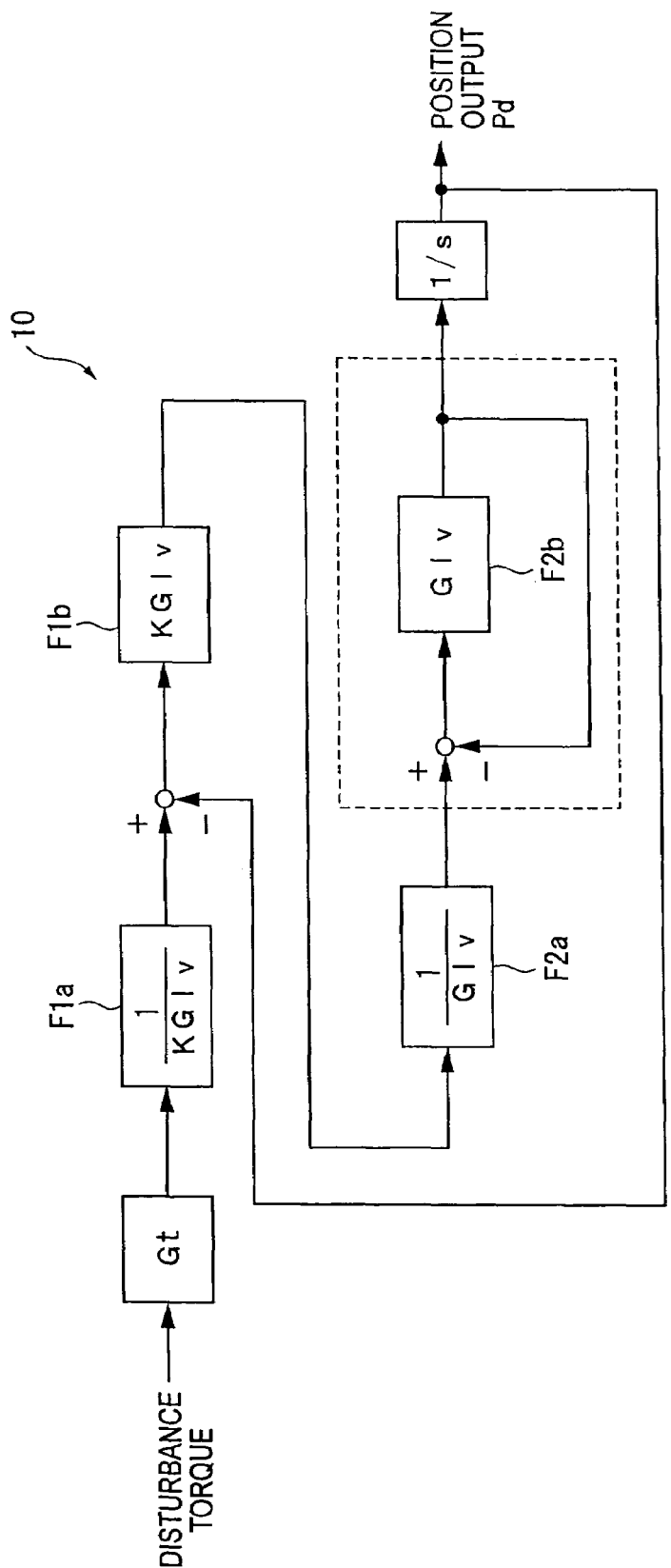
FIG. 12 is a block diagram obtained by equivalently transforming the arrangement in FIG. 11.

If the arrangement in FIG. 11 is equivalently transformed, the arrangement in FIG. 12 can be obtained. Note that forward elements F1a, F1b in FIG. 12 are elements that a backward element B1 in FIG. 11 is equivalently transformed, whereas forward elements F2a, F2b in FIG. 12 are elements that a backward element B2 in FIG. 11 is equivalently transformed.

Figure 13:
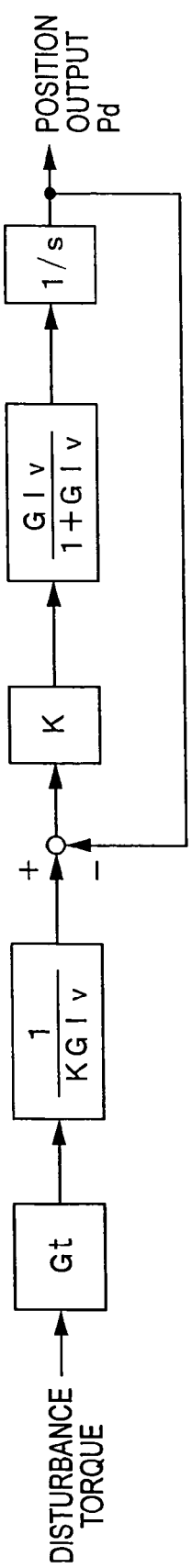
FIG. 13 is a block diagram obtained by equivalently transforming the arrangement in FIG. 12.

If the forward elements F1b and F2a in FIG. 12 are multiplied (a multiplication result is K), and a feedback loop (a portion surrounded by dashed line) including the forward element F2b in FIG. 12 is equivalently transformed, the arrangement in FIG. 13 can be obtained. If the feedback loop in FIG. 13 is equivalently transformed, the arrangement in FIG. 14 can be obtained.

Figure 14:
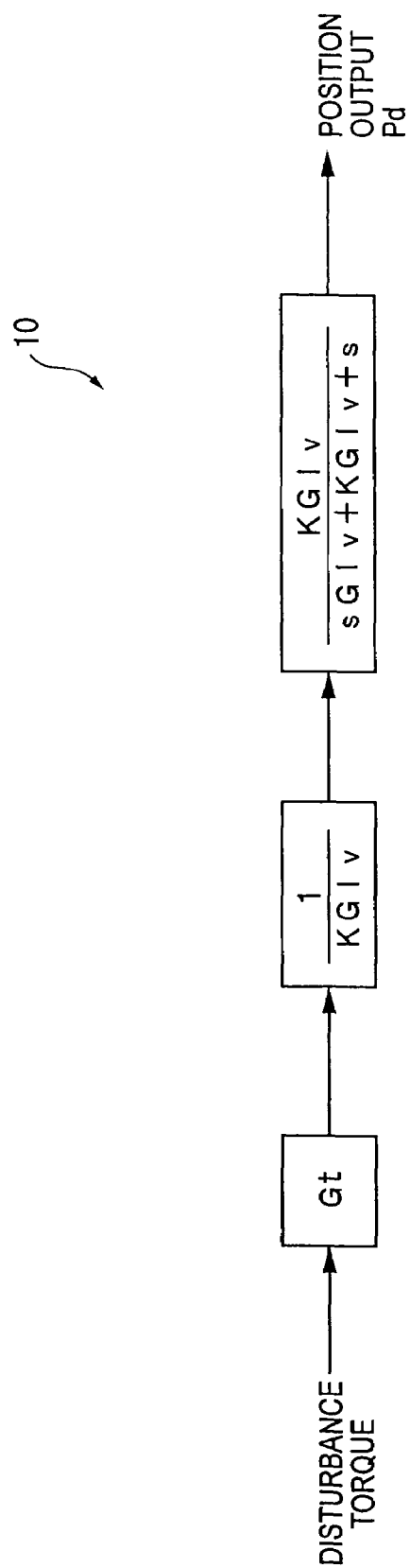
FIG. 14 is a block diagram obtained by equivalently transforming the arrangement in FIG. 13.

According to the arrangement in FIG. 14 obtained in the above-described manner, a transfer function Gc from the disturbance torque to the position output Pd in the conventional servomechanism 10 is expressed by an Equation (3) as follows.

$$Gc = \frac{Gt}{sGlv + KGlv + s} \qquad \text{Equation (3)}$$

Next, the same equivalent transformation is performed for the position control device 1 of the present embodiment.

Figure 15:
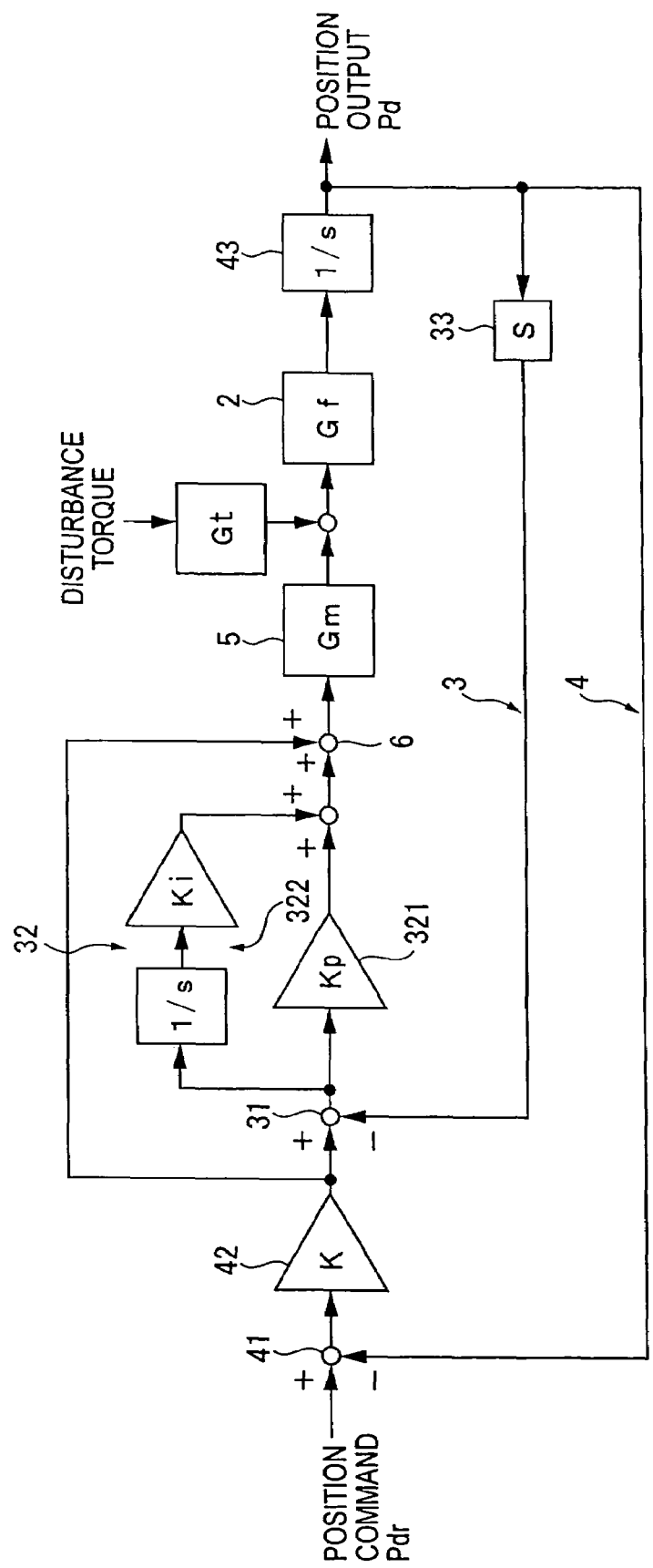
FIG. 15 is a block diagram showing an arrangement of a servomechanism of the embodiment with a disturbance torque applied.

FIG. 15 shows the position control device 1 of the present embodiment with a disturbance torque being applied.

Figure 16:
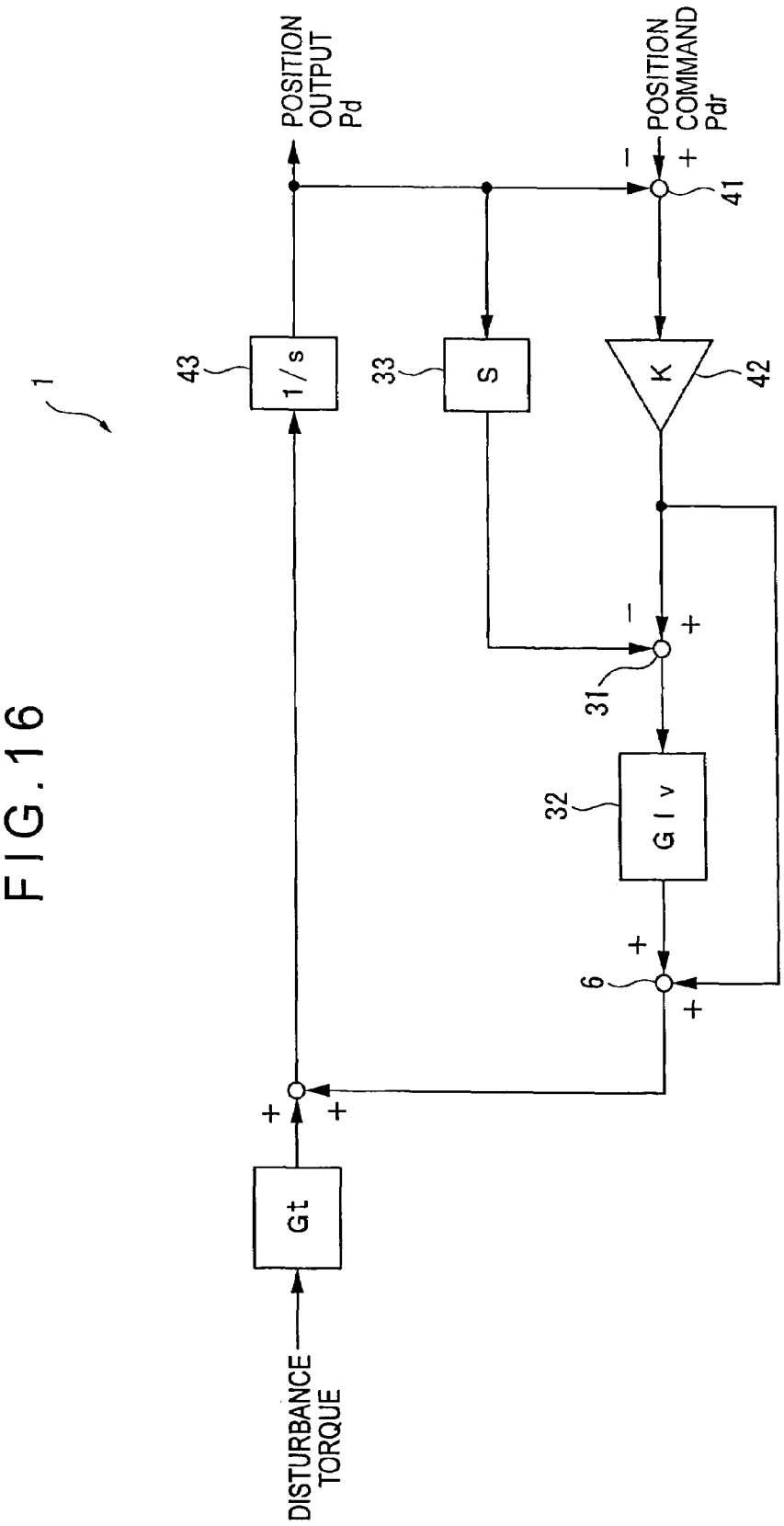
FIG. 16 is a block diagram obtained by the approximation of Gm≈1 and Gf≈1 as well as by presuming a disturbance torque as an input to the servomechanism to modify the arrangement in FIG. 15.
Figure 17:
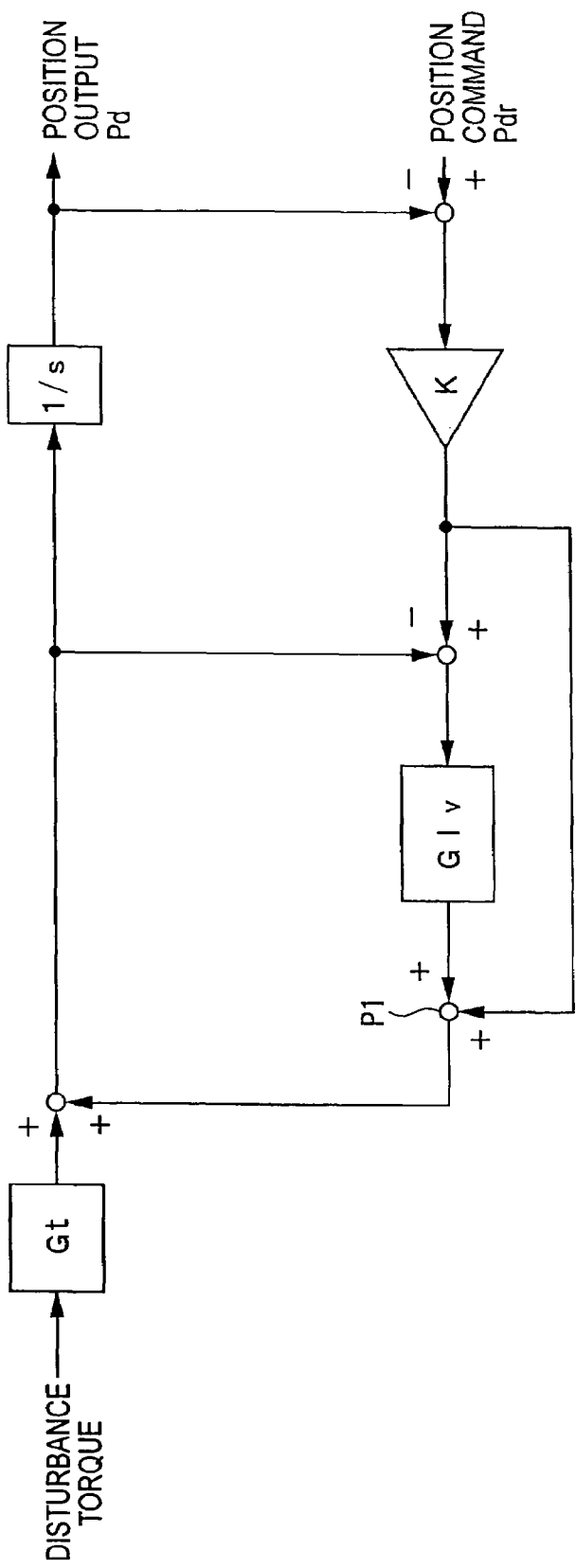
FIG. 17 is a block diagram obtained by equivalently transforming the arrangement in FIG. 16.

Similar to the above-described case, FIG. 15 can be redrawn as the arrangement in FIG. 16 by the approximation of Gm≈1 and Gf≈1 as well as by presuming a disturbance torque as an input to the position control device 1 (note that, the transfer function of the speed characteristic compensator 32 is collectively expressed as Glv). Further, the arrangement in FIG. 16 can be equivalently transformed to the arrangement in FIG. 17.

Figure 18:
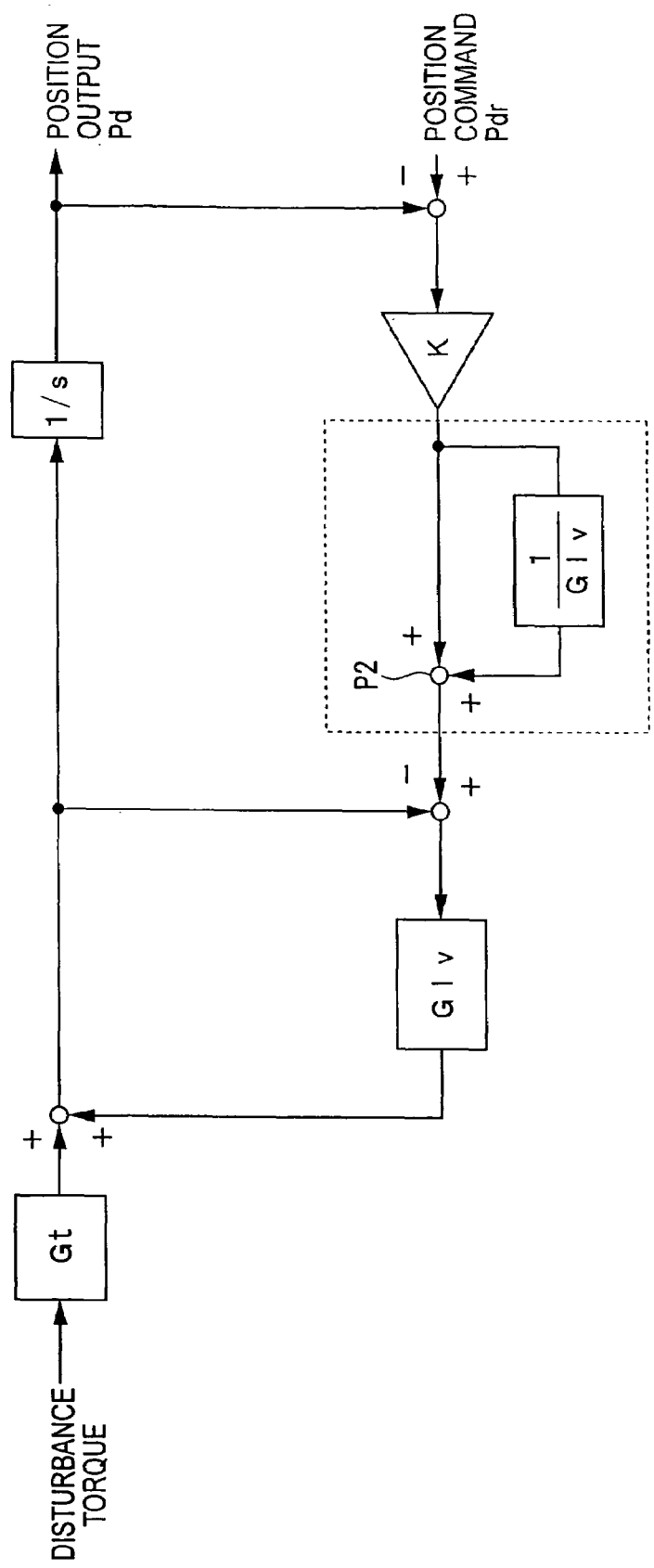
FIG. 18 is a block diagram obtained by equivalently transforming the arrangement in FIG. 17.
Figure 19:
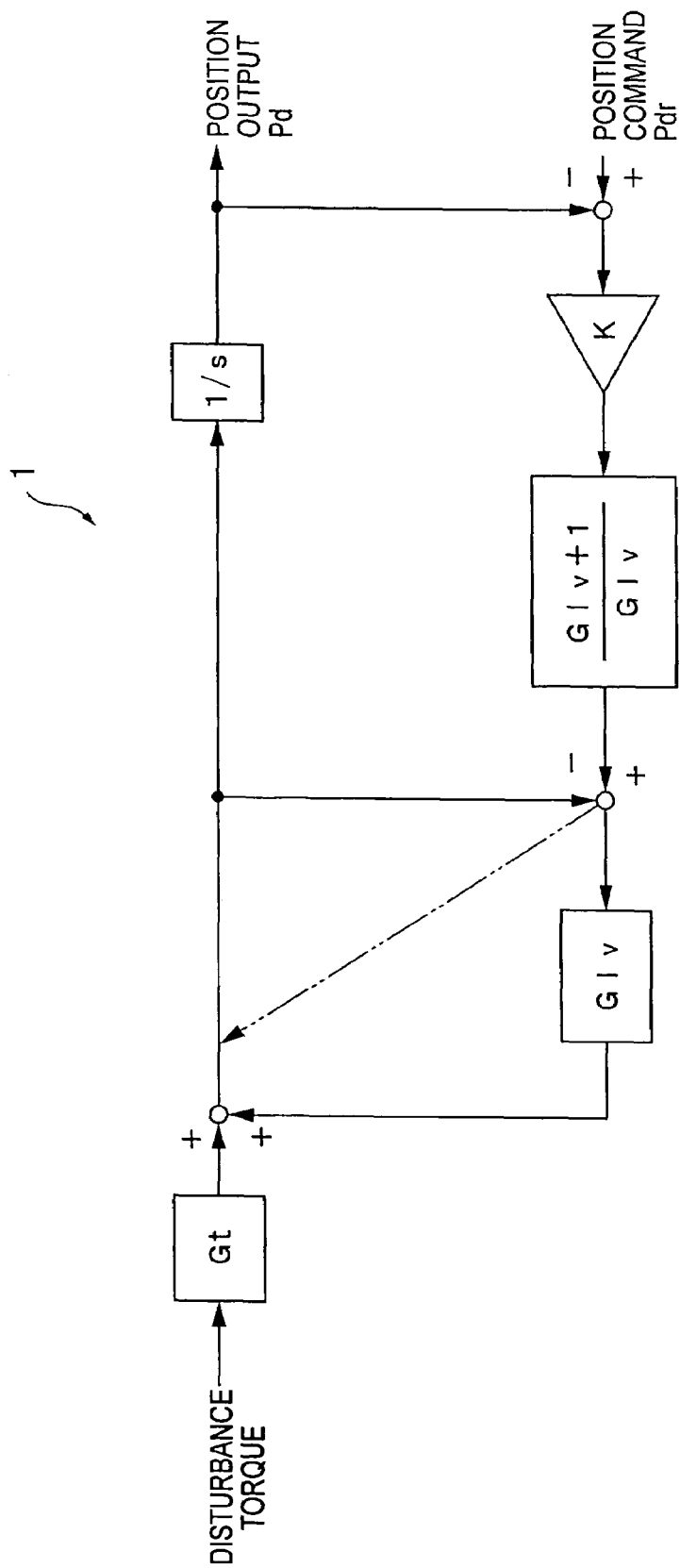
FIG. 19 is a block diagram obtained by equivalently transforming the arrangement in FIG. 18.

Then, if an addition point is changed (from P1 in FIG. 17 to P2 in FIG. 18), the arrangement in FIG. 18 can be obtained. And if a portion surrounded by dashed line in FIG. 18 is equivalently transformed, the arrangement in FIG. 19 can be obtained.

Figure 20:
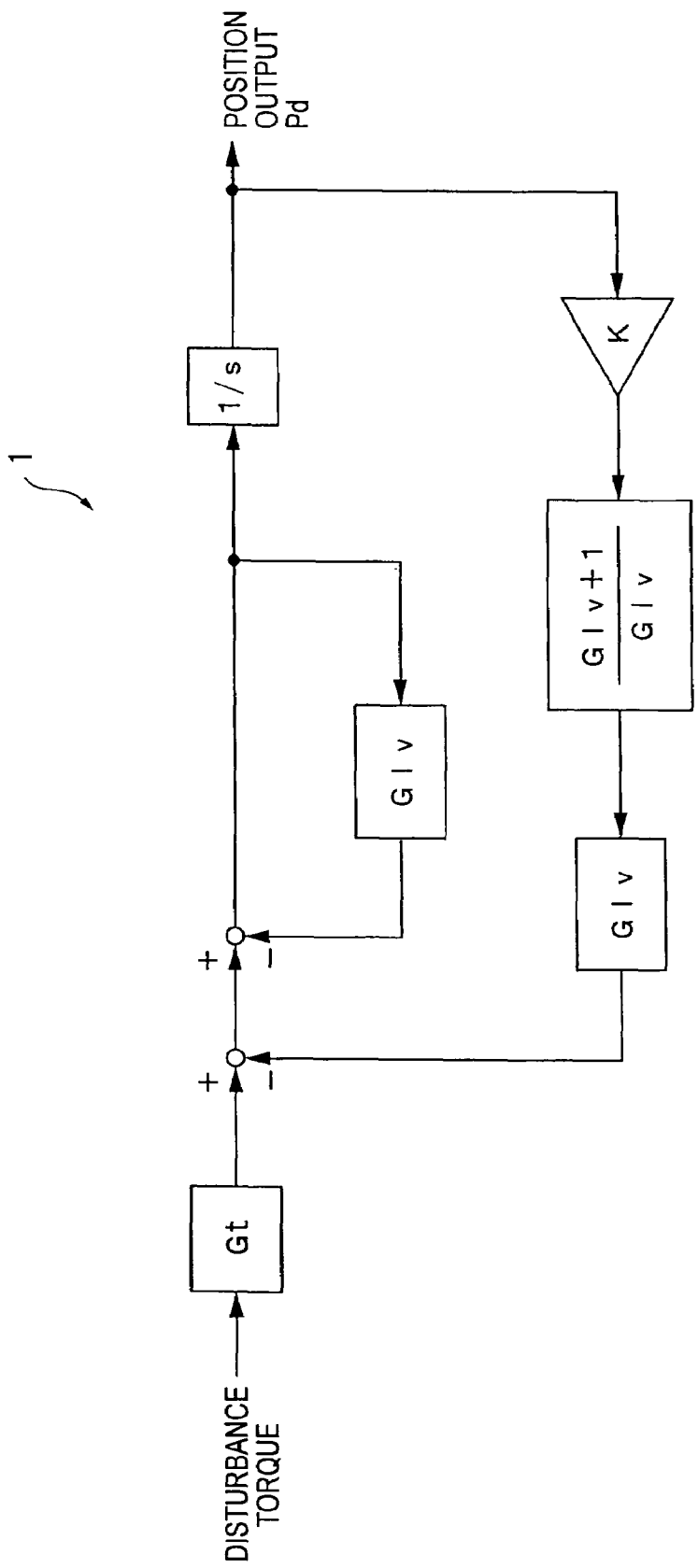
FIG. 20 is a block diagram obtained by equivalently transforming the arrangement in FIG. 19 when presuming a position command Pdr as 0.

Then, if the position command Pdr is presumed as 0 for only taking influence of the disturbance torque into consideration, and if a subtraction point is changed (see imaginary line in FIG. 19), the arrangement in FIG. 20 can be obtained.

Figure 21:
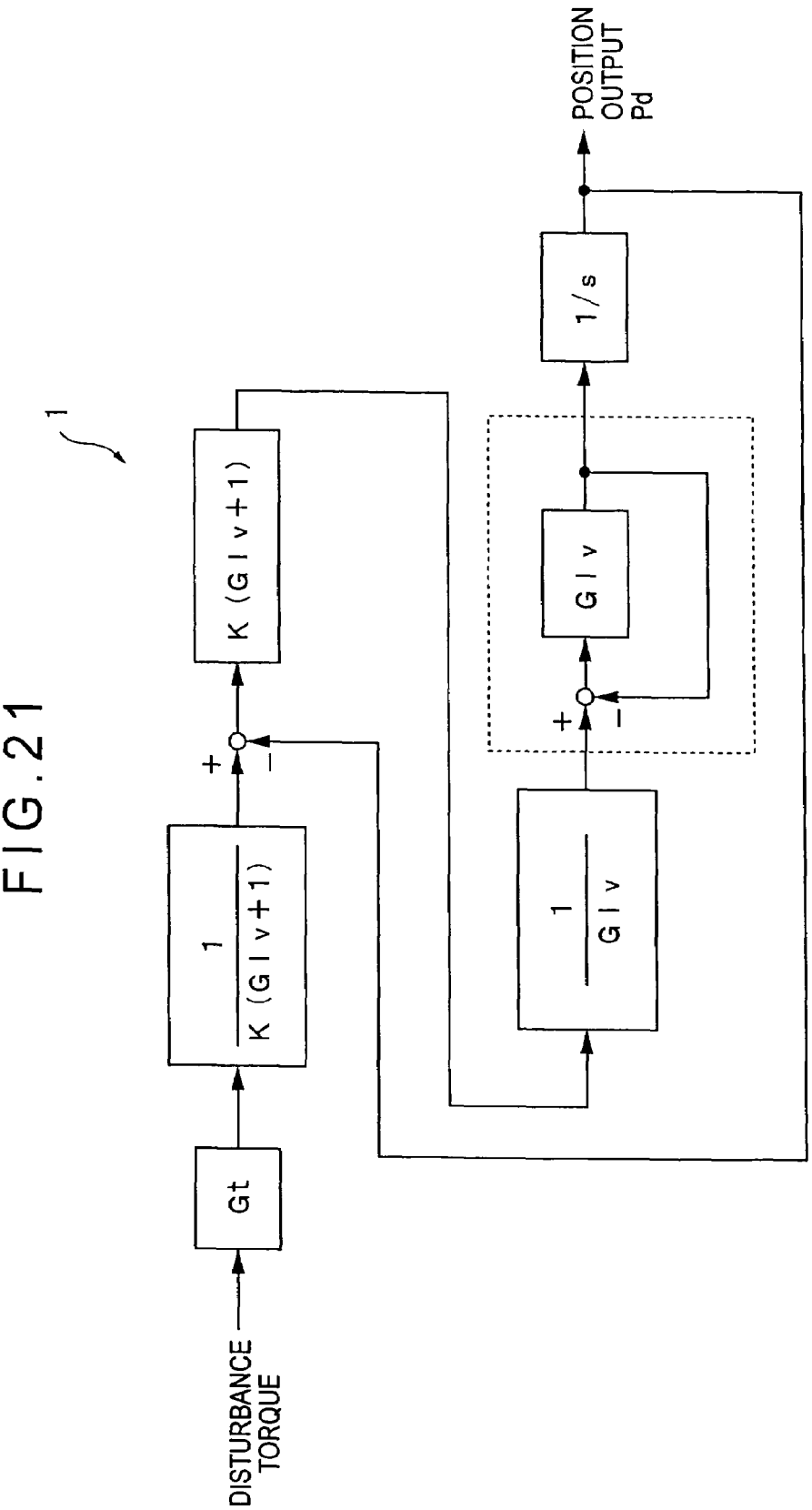
FIG. 21 is a block diagram obtained by equivalently transforming the arrangement in FIG. 20.

If the arrangement in FIG. 20 is equivalently transformed, the arrangement in FIG. 21 can be obtained (which is the same as the equivalent transformation from the arrangement in FIG. 11 to that in FIG. 12 in the conventional servomechanism 10).

Figure 22:
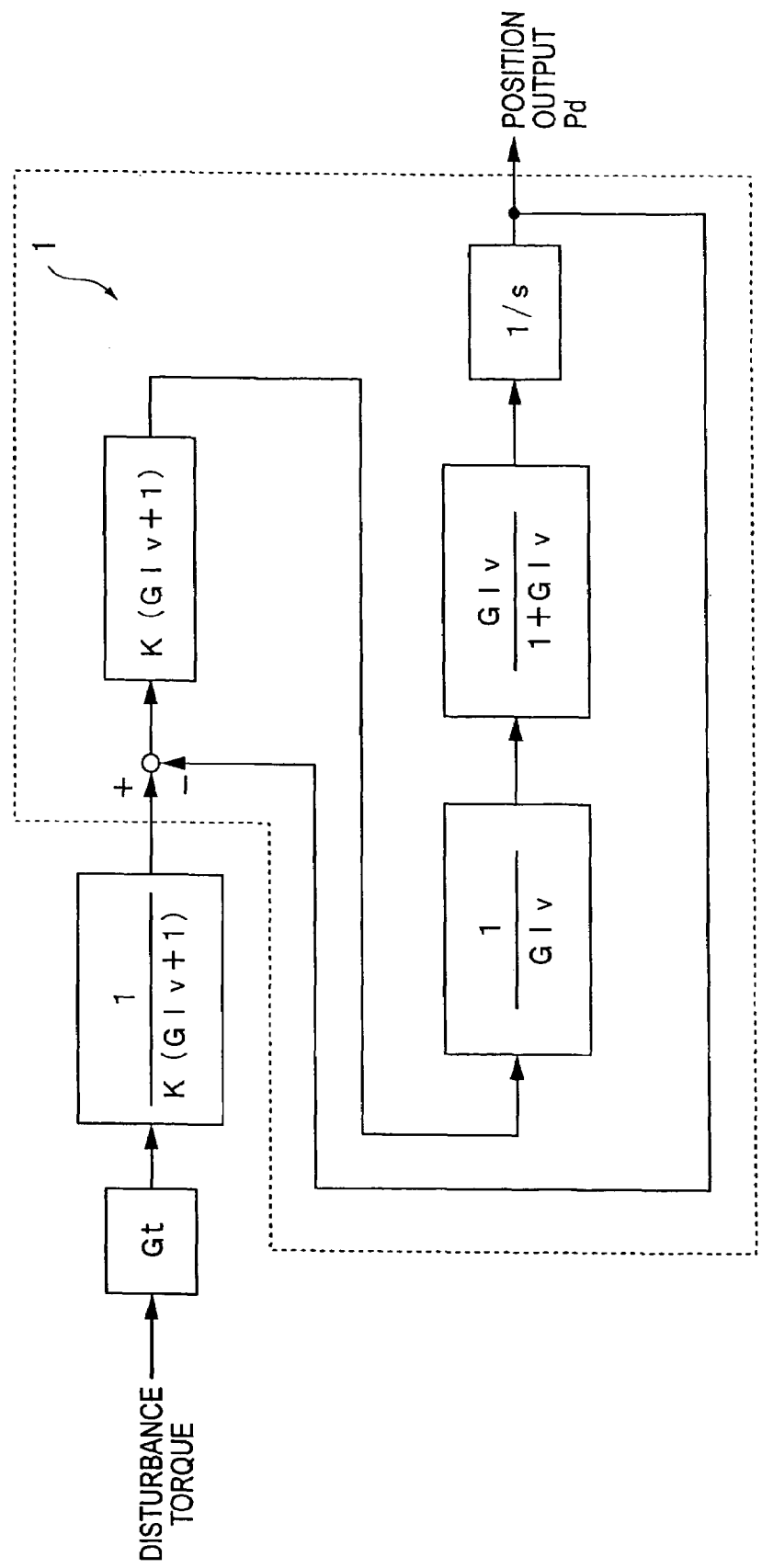
FIG. 22 is a block diagram obtained by equivalently transforming the arrangement in FIG. 21.

Further, if a portion surrounded by dashed line in FIG. 21 is equivalently transformed, the arrangement in FIG. 22 can be obtained. If a feedback loop (a portion surrounded by dashed line in FIG. 22) in FIG. 22 is equivalently transformed, the arrangement in FIG. 23 can be obtained.

Figure 23:
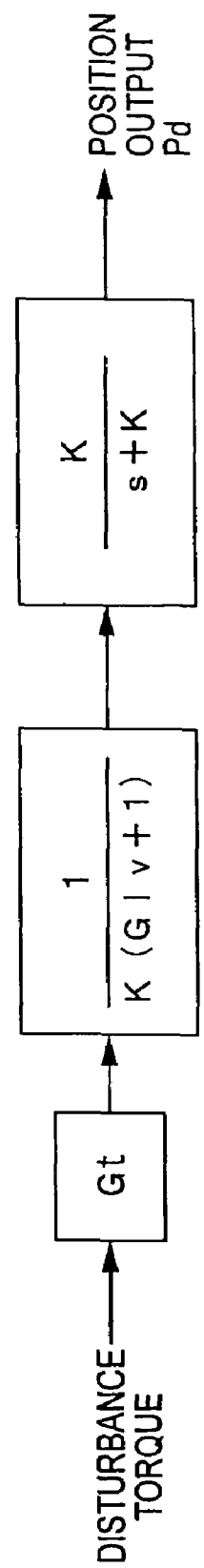
FIG. 23 is a block diagram obtained by equivalently transforming the arrangement in FIG. 22.

According to the arrangement in FIG. 23 obtained in the above-described manner, a transfer function Gn from the disturbance torque to the position output Pd in the position control device 1 of the present embodiment is expressed by an Equation (4) as follows.

$$Gn = \frac{Gt}{sGlv + KGlv + s + K} \qquad \text{Equation (4)}$$

When comparing the Gc of the Equation (3) with Gn of the Equation (4), only difference between Gc and Gn is K in the denominator. Note that K is a proportional gain of the position characteristic compensator 42 (420), and therefore it is positive. Thus, "the gain Gn<the gain Gc" is always established. This indicates that the position Pd of the driven body 2 (20) is less fluctuated due to the disturbance torque in the position control device 1 (the transfer function Gn) of the present embodiment rather than the case in the conventional servomechanism 10 (the transfer function Gc). Owing to this, the position control device 1 of the present embodiment can suppress the vibrating behavior of the driven body 2 (20) more than the conventional servomechanism 10 does.

Especially when the speed characteristic compensator 32 (320) is a PI compensator as in the above example, if Glv=Kp+(Ki/s)=[Kp(Tc·s+1)]/(Tc·s) is substituted into the Equations (3) and (4), Equations (5) and (6) can be obtained as follows. Note that Tc is a time constant of the speed characteristic compensator 32 (320), and thus Tc=Kp/Ki.

$$Gc = Gt \frac{Tc \cdot s}{K\,Kp} \frac{\frac{K\,Kp}{Tc(1+Kp)}}{s^2 + \frac{Kp(1+K \cdot Tc)}{Tc(1+Kp)}s + \frac{K\,Kp}{Tc(1+Kp)}} \qquad \text{Equation (5)}$$

$$= Gt \frac{Tc \cdot s}{K\,Kp} \frac{\omega^2}{s^2 + 2\zeta c \cdot \omega \cdot s + \omega^2}$$

if $$\zeta c = \frac{Kp(1 + K\,Tc)}{2\sqrt{K\,Kp Tc(1 + Kp)}},$$

$$\omega = \sqrt{\frac{K\,Kp}{Tc(1+Kp)}}$$

$$Gn = Gt \frac{Tc \cdot s}{K\,Kp} \frac{\frac{K\,Kp}{Tc(1+Kp)}}{s^2 + \frac{Kp(1+K \cdot Tc) + K \cdot T_c}{Tc(1+Kp)}s + \frac{K\,Kp}{Tc(1+Kp)}} \qquad \text{Equation (6)}$$

$$= Gt \frac{Tc \cdot s}{K\,Kp} \frac{\omega^2}{s^2 + 2\zeta n \cdot \omega \cdot s + \omega^2}$$

if $$\zeta n = \frac{Kp(1 + K \cdot Tc) + K \cdot Tc}{2\sqrt{K\,Kp\,Tc(1 + Kp)}},$$

$$\omega = \sqrt{\frac{K\,Kp}{Tc(1+Kp)}}$$

When comparing the Gc of the Equation (5) with Gn of the Equation (6), only difference between Gc and Gn is a damping ratio ($\zeta c$ and $\zeta n$). In addition, only difference between the damping ratio $\zeta c$ and the damping ratio $\zeta n$ is the term of K·Tc included in the numerator of $\zeta n$. Note that, since both of the proportional gain K of the position characteristic compensator 42 (420) and the time constant Tc of the speed characteristic compensator 32 (320) are positive, ζc<ζn is established. Thus, irrespective of the frequency ω, the gain Gn<the gain Gc is true. This indicates that the position control device 1 of the present embodiment can suppress the vibrating behavior of the driven body 2 (20) more than the conventional servomechanism 10 does.

In addition, if Glv is appropriately set, the vibrating behavior of the driven body 2 (20) can further be suppressed.

[Comparative Simulation of Position Control Device of Present Embodiment with Conventional Servomechanism]

Figure 24:
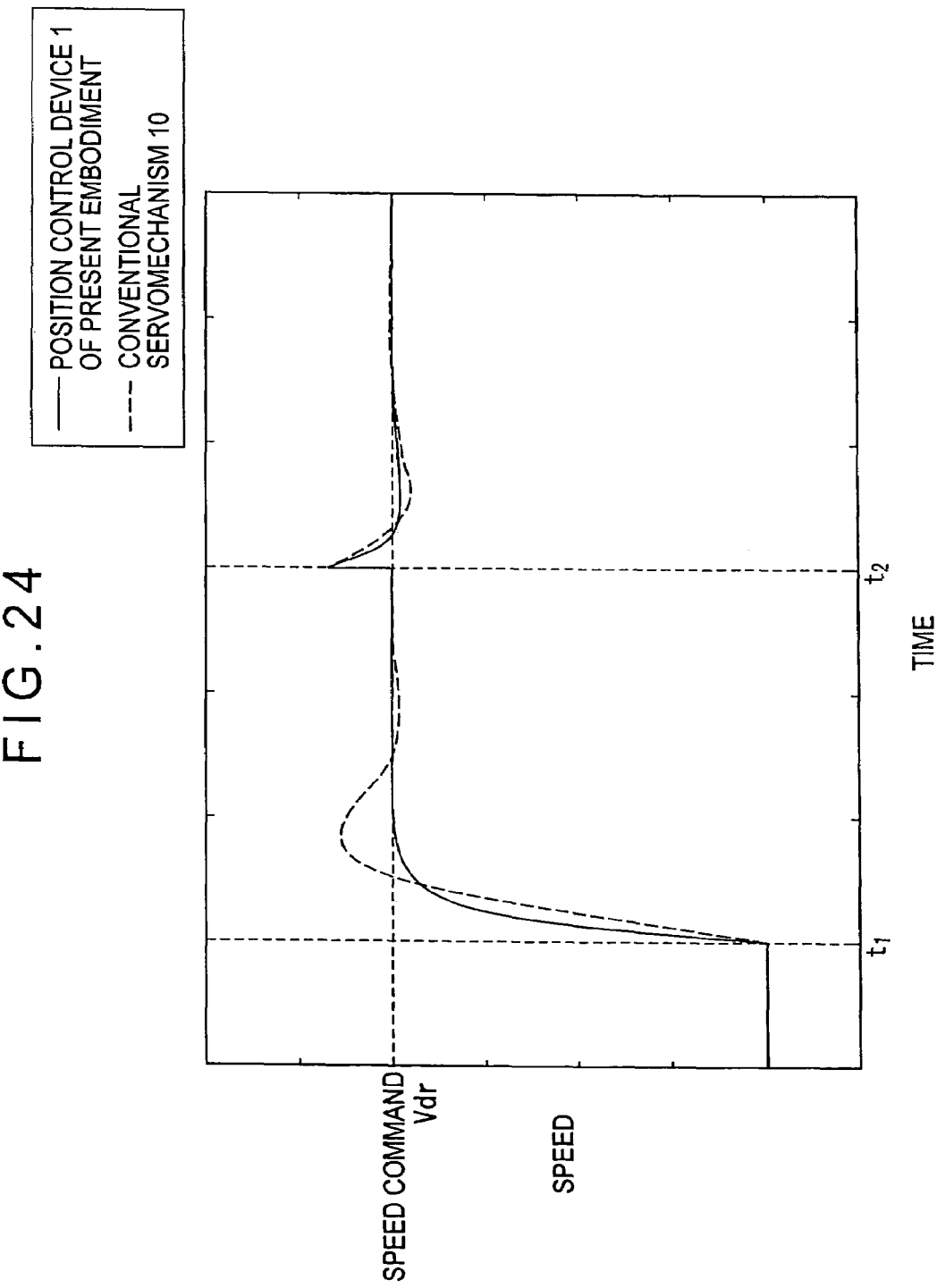
FIG. 24 is a graph showing a result of a comparative simulation of the position control device of the embodiment with the conventional servomechanism.

FIG. 24 illustrates a result of a comparative simulation of the position control device 1 of the present embodiment with the conventional servomechanism 10. In the drawing, a horizontal axis represents a time t while a vertical axis represents a speed of the driven body 2 (20). And, solid line shows a simulation result of the position control device 1 of the present embodiment, and dashed line shows a simulation result of the conventional servomechanism 10. $t_1$ represents a time when the ramp function-like position command Pdr (corresponding to the ramp function-like speed command Vdr) is input, and $t_2$ represents a time when the step function-like disturbance torque is applied.

As shown in FIG. 24, an overshoot of the speed Vd is occurred relative to the speed command Vdr immediately after the time $t_1$ passed in the conventional servomechanism 10, but no overshoot is occurred in the position control device 1 of the present embodiment.

Additionally, after the disturbance torque is applied (i.e. at the time $t_2$ or later), a speed is less fluctuated relative to the speed command Vdr as well as is recovered to the speed command Vdr more promptly in the position control device 1 than the case of the conventional servomechanism 10. This indicates that the position control device 1 of the present embodiment suppresses the vibrating behavior of the driven body 2 (20) more than the conventional servomechanism 10 does.

[Advantages of Embodiment]

According to the present embodiment, the following advantages can be attained.

By providing the adder 6, the position control device 1 functions as a control device of a first-order system, thereby properly avoiding the overshoot.

In addition, by providing the adder 6, the vibrating behavior of the driven body 2 can be suppressed more than the conventional servomechanism 10 does.

Further, it is only required to add the adder 6 to the conventional servomechanism 10 for arranging the position control device 1 having the above-mentioned two advantages, thus simplifying the arrangement of the position control device 1 and minimizing increase of the manufacturing cost.

Since the position control device 1 of the present embodiment is the quadruple loop position control device including the current control loop, the motor speed control loop, the speed control loop 3, and the position control loop 4, the position of the driven body 2 can more accurately be controlled as well as the vibrating behavior thereof more reliably be suppressed than the conventional and typical triple loop position control device does.

In particular, when the rigidity of the connection between the driven body 2 and the motor is low, the motion of the movable part (the rotor etc.) of the motor and the motion of the driven body 2 do not correspond completely to each other. Therefore, by providing the motor speed control loop and the speed control loop 3 (of the driven body 2) as in the present embodiment, the position Pd of the driven body 2 can accurately be controlled.

Even when the driven body 2 is the low rigid load possibly degrading the control characteristic of the position control device 1, the speed control loop 3 can accurately control the speed of the low rigid load, thus suppressing the vibrating behavior of the low rigid load and preventing the degradation in the control characteristic.

[Modification]

The present invention is not limited to the embodiment described above, and includes modifications of the embodiment within the technical scope of the present invention as long as the object of the present invention can be attained.

For example, in the above-described embodiment, the quadruple loop position control device 1 including the four control loops of the current control loop, the motor speed control loop, the speed control loop 3 and the position control loop 4, but the present invention may apply a triple loop position control device including the tree control loops of the current control loop, the speed control loop and the position control loop. In this case, the position control loop may control the position of the driven body directly or indirectly by controlling the position of the movable part in the driver. Similarly, the speed control loop may control the speed of the driven body directly or indirectly by controlling the speed of the movable part in the driver. Incidentally, the current control loop is adapted to control current to be applied to the driver. In such triple loop position control device, the adder adds the output value from the position characteristic compensator in the position control loop and the output value from the speed characteristic compensator in the speed control loop, and inputs the addition result as a current command to the current comparator in the current control loop.

In the above-described embodiment, the speed Vd of the driven body 2 is calculated by detecting the position Pd of the driven body 2 by the position detector (corresponding to the integrator element 43) and differentiating the position Pd by the differentiator 33, but in the present invention, the speed Vd may directly be detected by the speed detector instead of being calculated. In addition, the speed Vd of the driven body 2 may be detected by the speed detector and integrated to calculate the position Pd of the driver body 2 at least in principle, instead of that the position Pd of the driven body 2 is directly detected by the position detector etc.

In the above-mentioned embodiment, the PI compensator in which the proportional compensator 321 and the integral compensator 322 are connected in parallel is utilized as the speed characteristic compensator 32, but in the present invention, the arrangement of the speed characteristic compensator 32 may arbitrarily be set without limiting to the PI compensator. Even if the speed characteristic compensator 32 is not the PI compensator, the gain of Gn (of the present invention)<the gain of Gc (of the conventional art) is always established based on the Equations (3) and (4), thus constantly suppressing the vibrating behavior of the driven body according to the present invention.

Figure 29:
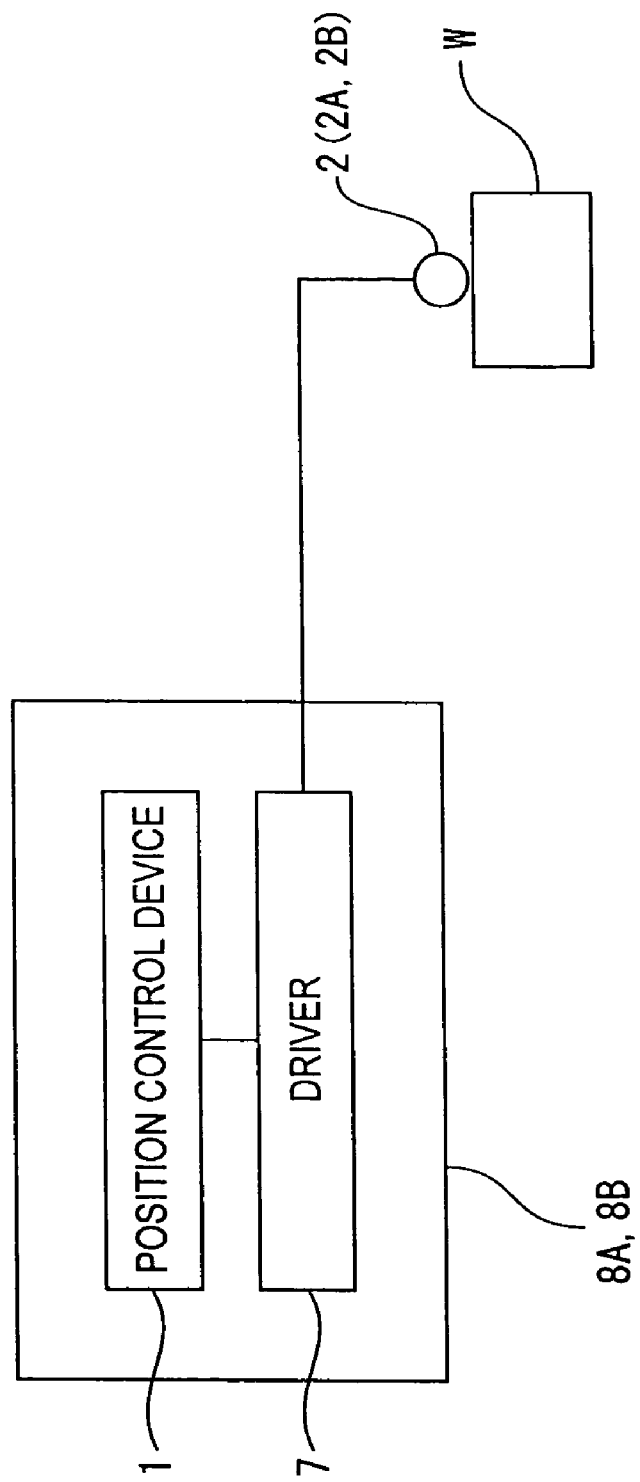
FIG. 29 is a block diagram showing an example of the arrangement of a measuring device, a machining device.

In the above-described embodiment, it is described that the position control device 1 controls the position of the driven body 2, but a measuring device and a machining device each including the position control device are included in the technical scope of the present invention. FIG. 29 is a block diagram showing an example of the arrangement of a measuring device 8A, a machining device 8B. The measuring device 8A includes, as the driven body 2, a probe 2A related to measurement of a workpiece W, while the machining device 8B includes, as the driven body 2, a tool 2B related to machining of the workpiece W. The position control device 1 controls a position of the driven body 2 (the probe 2A, the tool 2B) via a driver 7 such as a motor according to a predetermined position command.

The priority application Number JP2005-009423 upon which this patent application is based is hereby incorporated by reference.

What is claimed is:

1. A position control device that controls a position of a driven body driven by a driver according to a predetermined position command, comprising:

a position control loop including a position comparator that compares a current position of the driven body with the position command, and a position characteristic compensator that performs position characteristic compensation of the driven body based on a comparison result of the position comparator;

a speed control loop including a speed comparator that compares a current speed of the driven body with an output value from the position characteristic compensator as a speed command, and a speed characteristic compensator that performs speed characteristic compensation of the driven body based on a comparison result of the speed comparator;

an adder that adds the output value from the position characteristic compensator and an output value from the speed characteristic compensator; and a drive controller that operates the driver to drive the driven body based on an addition result of the adder.

2. The position control device according to claim 1, wherein the driver includes a movable part provided movably, and the driven body is connected to the movable part to be driven, the drive controller has a driving speed control loop that controls a driving speed of the movable part of the driver, and the driving speed control loop includes a driving speed comparator that compares a current driving speed of the movable part with the addition result of the adder as a driving speed command, and a driving speed characteristic compensator that performs driving speed characteristic compensation of the movable part based on a comparison result of the driving speed comparator.

3. The position control device according to claim 1, wherein the driven body is a low rigid load that degrades control characteristic of the position control device.

4. The position control device according to claim 1, wherein the speed characteristic compensator has a PI (proportional plus integral) compensator.

5. The position control device according to claim 1, wherein the speed characteristic compensator has a P (proportional) compensator.

6. A measuring device, comprising:

a position control device that controls a position of a driven body driven by a driver according to a predetermined position command, wherein the position control device includes:

a position control loop including a position comparator that compares a current position of the driven body with the position command, and a position characteristic compensator that performs position characteristic compensation of the driven body based on a comparison result of the position comparator;

a speed control loop including a speed comparator that compares a current speed of the driven body with an output value from the position characteristic compensator as a speed command, and a speed characteristic compensator that performs speed characteristic compensation of the driven body based on a comparison result of the speed comparator;

an adder that adds the output value from the position characteristic compensator and an output value from the speed characteristic compensator; and a drive controller that operates the driver to drive the driven body based on an addition result of the adder, and the driven body is a probe relating to measurement of a workpiece.

7. The measuring device according to claim 6, wherein the driver includes a movable part provided movably, and the driven body is connected to the movable part to be driven, the drive controller has a driving speed control loop that controls a driving speed of the movable part of the driver, and the driving speed control loop includes a driving speed comparator that compares a current driving speed of the movable part with the addition result of the adder as a driving speed command, and a driving speed characteristic compensator that performs driving speed characteristic compensation of the movable part based on a comparison result of the driving speed comparator.

8. The measuring device according to claim 6, wherein the driven body is a low rigid load that degrades control characteristic of the position control device.

9. The measuring device according to claim 6, wherein the speed characteristic compensator has a PI (proportional plus integral) compensator.

10. The measuring device according to claim 6, wherein the speed characteristic compensator has a P (proportional) compensator.

11. A machining device, comprising:

a position control device that controls a position of a driven body driven by a driver according to a predetermined position command, wherein the position control device includes:

a position control loop including a position comparator that compares a current position of the driven body with the position command, and a position characteristic compensator that performs position characteristic compensation of the driven body based on a comparison result of the position comparator;

a speed control loop including a speed comparator that compares a current speed of the driven body with an output value from the position characteristic compensator as a speed command, and a speed characteristic compensator that performs speed characteristic compensation of the driven body based on a comparison result of the speed comparator;

an adder that adds the output value from the position characteristic compensator and an output value from the speed characteristic compensator; and a drive controller that operates the driver to drive the driven body based on an addition result of the adder, and the driven body is a tool relating to machining of a workpiece.

12. The machining device according to claim 11, wherein
the driver includes a movable part provided movably, and the driven body is connected to the movable part to be driven,
the drive controller has a driving speed control loop that controls a driving speed of the movable part of the driver, and
the driving speed control loop includes a driving speed comparator that compares a current driving speed of the movable part with the addition result of the adder as a driving speed command, and a driving speed characteristic compensator that performs driving speed characteristic compensation of the movable part based on a comparison result of the driving speed comparator.

13. The machining device according to claim 11, wherein the driven body is a low rigid load that degrades control characteristic of the position control device.

14. The machining device according to claim 11, wherein the speed characteristic compensator has a PI (proportional plus integral) compensator.

15. The machining device according to claim 11, wherein the speed characteristic compensator has a P (proportional) compensator.

* * * * *